(12) United States Patent
Nakata et al.

(10) Patent No.: US 11,717,961 B2
(45) Date of Patent: Aug. 8, 2023

(54) ROBOT CONTROL METHOD AND ROBOT CONTROL DEVICE

(71) Applicant: Panasonic Intellectual Property Management Co., Ltd., Osaka (JP)

(72) Inventors: Hiroyuki Nakata, Osaka (JP); Hiroyoshi Ueda, Osaka (JP); Atsumi Hashimoto, Osaka (JP); Ryosuke Yamamoto, Osaka (JP); Masayoshi Iwatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 17/136,344

(22) Filed: Dec. 29, 2020

(65) Prior Publication Data

US 2021/0114212 A1  Apr. 22, 2021

Related U.S. Application Data

(63) Continuation of application No. PCT/JP2019/020459, filed on May 23, 2019.

(30) Foreign Application Priority Data

Jul. 2, 2018  (JP) ................. 2018-126187

(51) Int. Cl.
*B25J 9/16* (2006.01)
*B25J 13/08* (2006.01)

(52) U.S. Cl.
CPC .......... *B25J 9/1641* (2013.01); *B25J 9/1638* (2013.01); *B25J 9/1664* (2013.01); *B25J 13/088* (2013.01)

(58) Field of Classification Search
CPC ...... B25J 9/1641; B25J 9/1638; B25J 9/1664; B25J 13/088; G05B 2219/41078; G05B 2219/41084
See application file for complete search history.

(56) References Cited

U.S. PATENT DOCUMENTS 5,804,940 A * 9/1998 Erkens ................ G05B 19/19
318/568.22
6,252,368 B1  6/2001 Sugie
(Continued)

FOREIGN PATENT DOCUMENTS

JP  3703664  10/2005

OTHER PUBLICATIONS

International Search Report dated Jun. 25, 2019 in International (PCT) Application No. PCT/JP2019/020459.
(Continued)

*Primary Examiner* — Adam R Mott
*Assistant Examiner* — Sagar Kc
(74) *Attorney, Agent, or Firm* — Wenderoth, Lind & Ponack, L.L.P.

(57) ABSTRACT

In an angular velocity calculation block, an angular velocity component is calculated based on a position command for a joint portion. In a kinetic calculation block, a kinetic torque is calculated based on the position command for the joint portion. In a command velocity component reversal detection block, a reversal timing is calculated based on the angular velocity component. In a reverse torque detection block, a reverse torque is calculated based on the kinetic torque and the reversal timing. In a backlash correction amount calculation block, the correction amount of the joint portion is calculated based on the kinetic torque, the reverse torque, and the reversal timing.

6 Claims, 23 Drawing Sheets

(56) References Cited

U.S. PATENT DOCUMENTS

| | | | |
|---|---|---|---|
| 9,436,916 B2* | 9/2016 | Veit | F02D 41/3845 |
| 2011/0160907 A1* | 6/2011 | Orita | B25J 9/1607 |
| | | | 700/260 |
| 2014/0276952 A1* | 9/2014 | Hourtash | A61B 34/30 |
| | | | 700/263 |
| 2017/0043481 A1* | 2/2017 | Hannya | B25J 9/1641 |
| 2018/0169860 A1* | 6/2018 | Fukuoka | B25J 9/1641 |
| 2018/0200882 A1* | 7/2018 | Shinoda | B25J 9/1085 |

OTHER PUBLICATIONS

Office Action dated Jul. 19, 2022 in corresponding Indian Patent Application No. 202147001509.
Extended European Search Report dated Jul. 21, 2021 in European Patent Application No. 19829845.7.

* cited by examiner

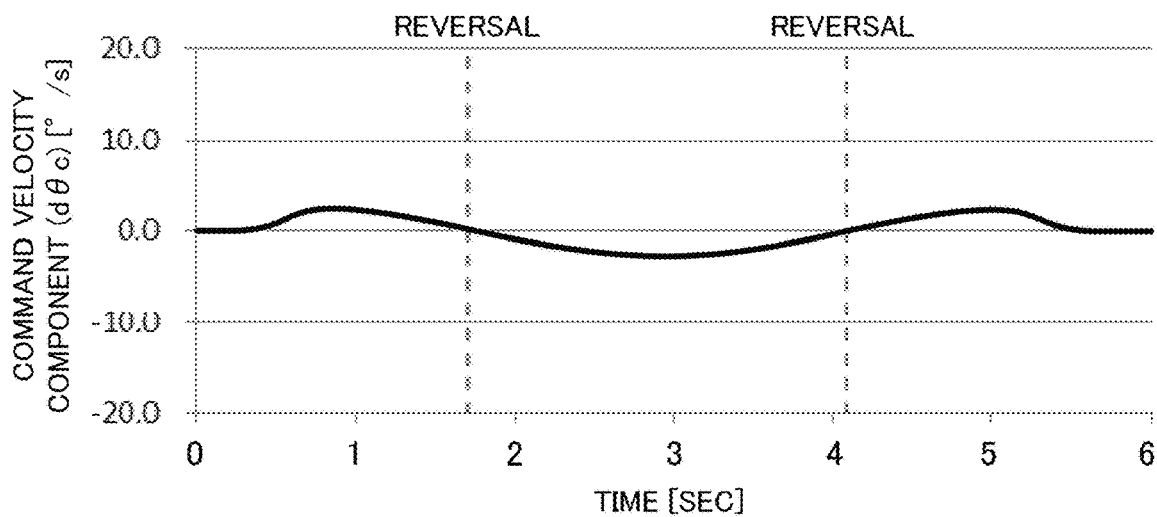
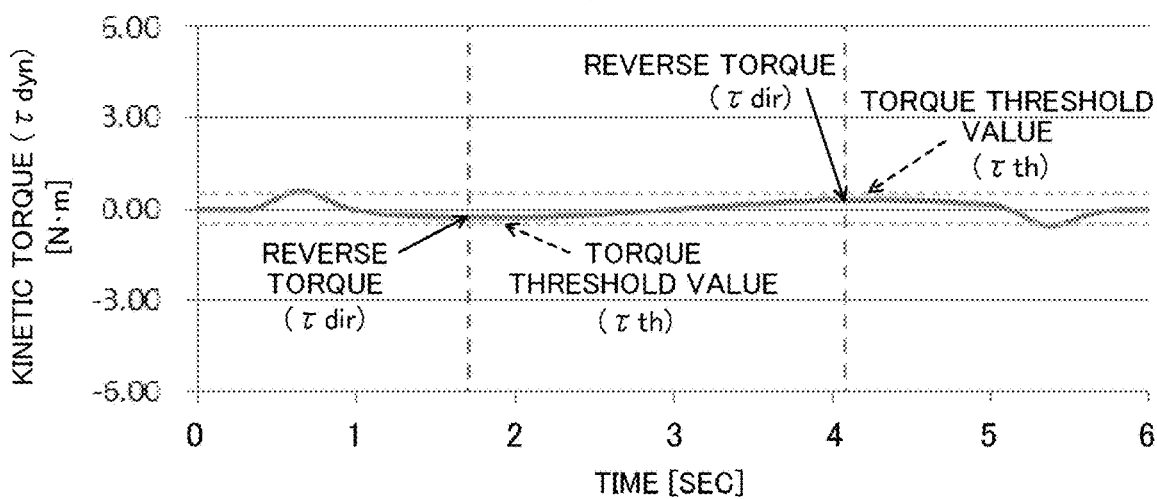
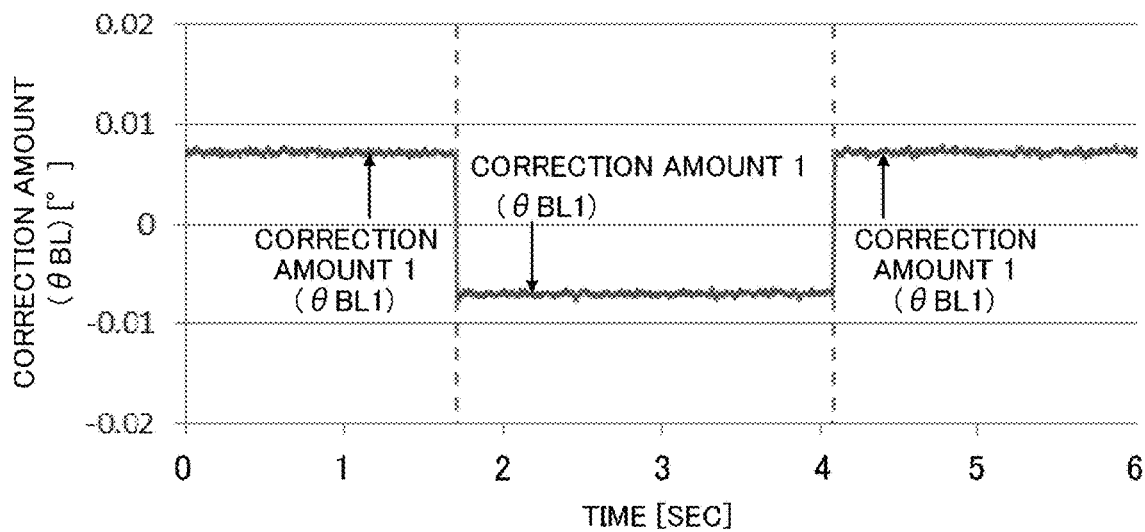

ROBOT CONTROL METHOD AND ROBOT CONTROL DEVICE

CROSS-REFERENCE TO RELATED APPLICATIONS

This is a continuation of International Application No. PCT/JP2019/020459 filed on May 23, 2019, which claims priority to Japanese Patent Application No. 2018-126187 filed on Jul. 2, 2018. The entire disclosures of these applications are incorporated by reference herein.

BACKGROUND

The present invention relates to a robot control method and a robot control device.

If the direction of rotation of a motor is reversed, a so-called backlash error, i.e., a situation where a target amount of movement that is a numerical value to be controlled does not match the relative amount of movement of a table or a workpiece, has been known to arise (see, for example, Japanese Patent No. 370366).

Japanese Patent No. 370366 discloses a configuration in which the magnitude of a corrected step signal is reduced in proportion to a level corresponding to a lapse of time after the reversal of increasing or decreasing direction of a position command signal, and the resultant signal is output as a position correction signal (backlash information) to correct backlash.

SUMMARY

The inventors of this application have discovered that factors that cause a position deviation of a robot arm, i.e., a path error, are not only the backlash error, but the following situation also cause a path error: when the rotational speed of a motor is accelerated, the reverse torque produced at the reserve of the motor increases, which applies instantaneous torsion to a speed reducer of the motor.

However, a known backlash correction device corrects only backlash errors, and is designed with no consideration given to the influence of torsion resulting from a reverse torque. This increases a path error of a robot arm.

In view of the foregoing background, it is an object of the present invention to reduce a path error of a robot arm.

Aspects of the present disclosure are directed to a robot control method for controlling a motion of a robot arm having a plurality of joint portions, and provide the following solutions.

Specifically, a robot control method according to a first aspect includes:

calculating an angular velocity of at least one of the plurality of joint portions which is targeted for correction;

calculating a torque applied to the at least one joint portion targeted for correction, based on position commands for the plurality of joint portions;

calculating a reversal timing at which a direction of rotation of the at least one joint portion targeted for correction is reversed, based on the angular velocity of the at least one joint portion targeted for correction;

calculating a reverse torque applied to the at least one joint portion targeted for correction, based on the torque and the reversal timing; and calculating, based on the reverse torque and the reversal timing, a torsion correction amount and correction time for correcting torsion that occurs, due to the reverse torque, at the at least one joint portion targeted for correction.

In the first aspect, the torsion correction amount and correction time for correcting torsion that occurs at the joint portion targeted for correction are calculated based on the reverse torque and the reversal timing.

Such control in consideration of the influence of the torsion that occurs at the joint portion targeted for correction can reduce the path error of the robot arm.

A second aspect is an embodiment of the first aspect. In the second aspect, if the reverse torque is smaller than a predetermined threshold value, correcting a corresponding one of the position commands for the at least one joint portion targeted for correction, based on a backlash correction amount for correcting backlash that occurs at the at least one joint portion targeted for correction, and if the reverse torque is larger than the predetermined threshold value, correcting the position command for the at least one joint portion targeted for correction, based on the backlash correction amount, the torsion correction amount, and the correction time.

In the second aspect, if the reverse torque is smaller than the predetermined threshold value, it is determined that the influence of the torsion that occurs at the joint portion targeted for correction is small, and only backlash that occurs at the joint portion is corrected. If the reverse torque is larger than the predetermined threshold value, torsion in addition to the backlash occurring at the joint portion targeted for correction are corrected.

A third aspect is an embodiment of the first or second aspect. In the third aspect, in the calculating the torsion correction amount and the correction time, the torsion correction amount and the correction time are calculated such that as the reverse torque increases, the torsion correction amount increases and the correction time decreases.

In the third aspect, as the reverse torque increases, the torsion correction amount increases and the correction time decreases. This configuration effectively reduces the torsion at the joint portion, and allows accurate correction of the positional deviation of the robot arm.

A fourth aspect is directed to a robot control method for controlling a motion of a robot arm having a plurality of joint portions. At least one of the plurality of joint portions which is targeted for correction has a pivot on which the robot arm is pivoted. The method includes:

calculating an angular velocity of the pivot based on a position command for the pivot;

calculating an acceleration of the pivot based on the angular velocity of the pivot;

calculating a reversal timing at which a direction of rotation of the pivot is reversed, based on the angular velocity of the pivot;

calculating an acceleration at reversal of the pivot based on the acceleration of the pivot and the reversal timing; and calculating a torsion correction amount and correction time for correcting torsion that occurs at the pivot at the reversal of the pivot, based on the acceleration at reversal and the reversal timing.

In the fourth aspect, the torsion correction amount and correction time for correcting torsion that occurs at the pivot, which is the joint portion targeted for correction, are calculated based on the acceleration at reversal and the reversal timing.

Such control in consideration of the influence of the torsion that occurs at the pivot can reduce the path error of the robot arm.

Further, since the torsion correction amount and the correction time are calculated based on the acceleration at reversal, the calculation amount can be reduced compared, for example, with a case in which the torsion correction amount and the correction time are calculated based on the kinetic torque.

Specifically, to determine the kinetic torque, all the torques (e.g., gravitational torque, inertial force, centrifugal force, and Coriolis force) applied to the axis of the joint portion need to be calculated. Thus, inverse kinetics calculation needs to be performed using the positions, velocities, accelerations, and mechanical parameters of all of the axes. Such calculation enables accurate calculation of the kinetic torque, but results in slow arithmetic processing speed.

To address the problem, the inventors of this application focused on the fact that a main component of kinetic torque of a pivot to which gravity is not applied is the inertial force of its own axis. Calculating, based on the acceleration at reversal, the torsion correction amount and the correction time for only the pivot can reduce the calculation amount.

A fifth aspect is an embodiment of the fourth aspect. In the fifth aspect, if the acceleration at reversal is smaller than a predetermined threshold value, correcting the position command for the pivot, based on a backlash correction amount for correcting backlash that occurs at the pivot, and if the acceleration at reversal is larger than the predetermined threshold value, correcting the position command for the pivot, based on the backlash correction amount, the torsion correction amount, and the correction time.

In the fifth aspect, if the acceleration at reversal is smaller than the predetermined threshold value, it is determined that the influence of the torsion that occurs at the pivot is small, and only backlash that occurs at the pivot is corrected. If the acceleration at reversal is larger than the predetermined threshold value, torsion in addition to the backlash occurring at the pivot are corrected.

A sixth aspect is an embodiment of the fourth or fifth aspect. In the sixth aspect, in the calculating the torsion correction amount and the correction time, the torsion correction amount and the correction time are calculated such that as the acceleration at reversal increases, the torsion correction amount increases and the correction time decreases.

In the sixth aspect, as the acceleration at reversal increases, the torsion correction amount increases and the correction time decreases. This configuration effectively reduces the torsion at the pivot, and allows accurate correction of the positional deviation of the robot arm.

A seventh aspect is directed to a robot control device for controlling a motion of a robot arm having a plurality of joint portions. The robot control device includes: an angular velocity calculator that calculates an angular velocity of at least one of joint portions which is targeted for correction; a kinetic calculator that calculates a torque applied to the at least one joint portion targeted for correction, based on position commands for the plurality of joint portions; a reversal timing calculator that calculates a reversal timing at which a direction of rotation of the at least one joint portion targeted for correction is reversed, based on the angular velocity of the at least one joint portion targeted for correction; a reverse torque calculator that calculates a reverse torque applied to the at least one joint portion targeted for correction, based on the torque and the reversal timing; and a correction amount calculator that calculates, based on the reverse torque and the reversal timing, a torsion correction amount and correction time for correcting torsion that occurs, due to the reverse torque, at the at least one joint portion targeted for correction.

In the seventh aspect, the torsion correction amount and correction time for correcting torsion that occurs at the joint portion targeted for correction are calculated based on the reverse torque and the reversal timing.

Such control in consideration of the influence of the torsion that occurs at the joint portion targeted for correction can reduce the path error of the robot arm.

An eighth aspect is directed to a robot control device for controlling a motion of a robot arm having a plurality of joint portions. At least one of the plurality of joint portions which is targeted for correction has a pivot on which the robot arm is pivoted. The device includes: an angular velocity calculator that calculates an angular velocity of the pivot based on a position command for the pivot; an acceleration calculator that calculates an acceleration of the pivot based on the angular velocity of the pivot; a reversal timing calculator that calculates a reversal timing at which a direction of rotation of the pivot is reversed, based on the angular velocity of the pivot; a reversal acceleration calculator that calculates an acceleration at reversal of the pivot based on the acceleration of the pivot and the reversal timing; and a correction amount calculator that calculates a torsion correction amount and correction time for correcting torsion that occurs at the pivot at the reversal of the pivot, based on the acceleration at reversal and the reversal timing.

In the eighth aspect, the torsion correction amount and correction time for correcting torsion that occurs at the pivot, which is the joint portion targeted for correction, are calculated based on the acceleration at reversal and the reversal timing.

Such control in consideration of the influence of the torsion that occurs at the pivot can reduce the path error of the robot arm.

Further, since the torsion correction amount and the correction time are calculated based on the acceleration at reversal, the calculation amount can be reduced compared, for example, with a case in which the torsion correction amount is calculated based on the kinetic torque.

According to the aspects of the present disclosure, a path error of a robot arm can be reduced.

BRIEF DESCRIPTION OF THE DRAWINGS

FIG. 6A is a graph showing variations in command velocity component.

FIG. 6B is a graph showing variations in kinetic torque.

FIG. 6C is a graph showing variations in correction amount.

DETAILED DESCRIPTION

Embodiments of the present invention will be described in detail below with reference to the drawings. Note that the following description of embodiments is merely an example in nature, and is not intended to limit the scope, applications, or use of the present invention.

First Embodiment

Figure 1:
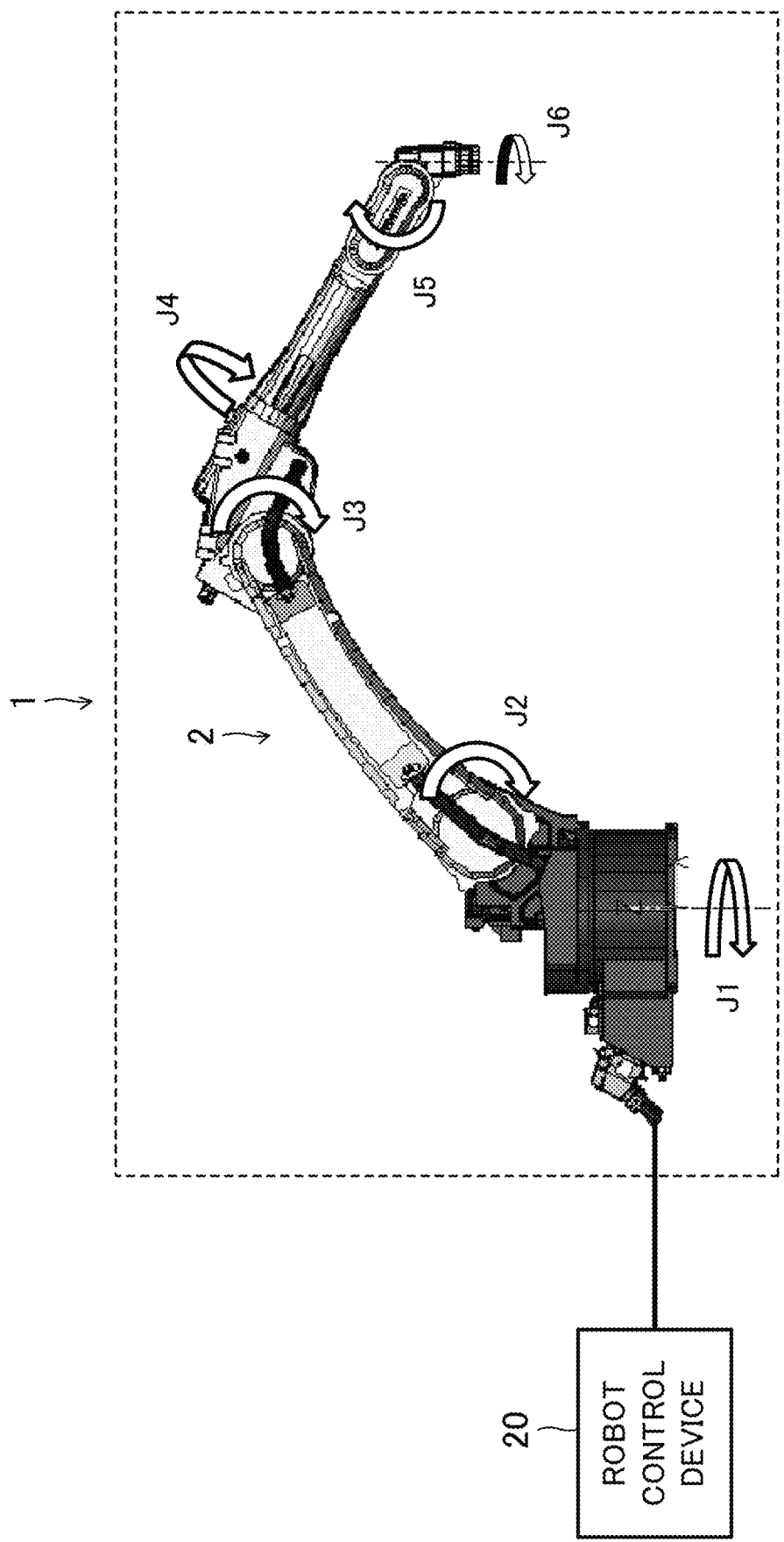
FIG. 1 illustrates a configuration of a robot according to a first embodiment.

As illustrated in FIG. 1, a vertical articulated robot 1 includes a robot arm 2 and a plurality of joint portions J1 to J6. A robot control device 20 is connected to the robot 1.

The robot arm 2 is divided into a plurality of parts. The junction between adjacent ones of the parts is provided with an associated one of the joint portions J1 to J6. Servomotors 12 are connected to the respective joint portions J1 to J6 via speed reducers 13 (see FIG. 12).

The servomotors 12 are each driven based on a position command $\theta c$ from the robot control device 20, and rotate the joint portions J1 to J6 by intended amounts, thereby controlling the motion and posture of the robot arm 2.

In this embodiment, the joint portions J1 to J3 are three main axes that determine the overall posture of the robot arm 2, and the joint portions J4 to J6 are three wrist axes that determine the direction of the tip of the robot arm 2. The joint portion J1 has a pivot on which the robot arm 2 is pivoted.

A case will be described below in which a laser output device (not shown) is mounted on the tip of the robot arm 2 to perform an operation of cutting a workpiece by applying laser beams to the workpiece.

Figure 2:
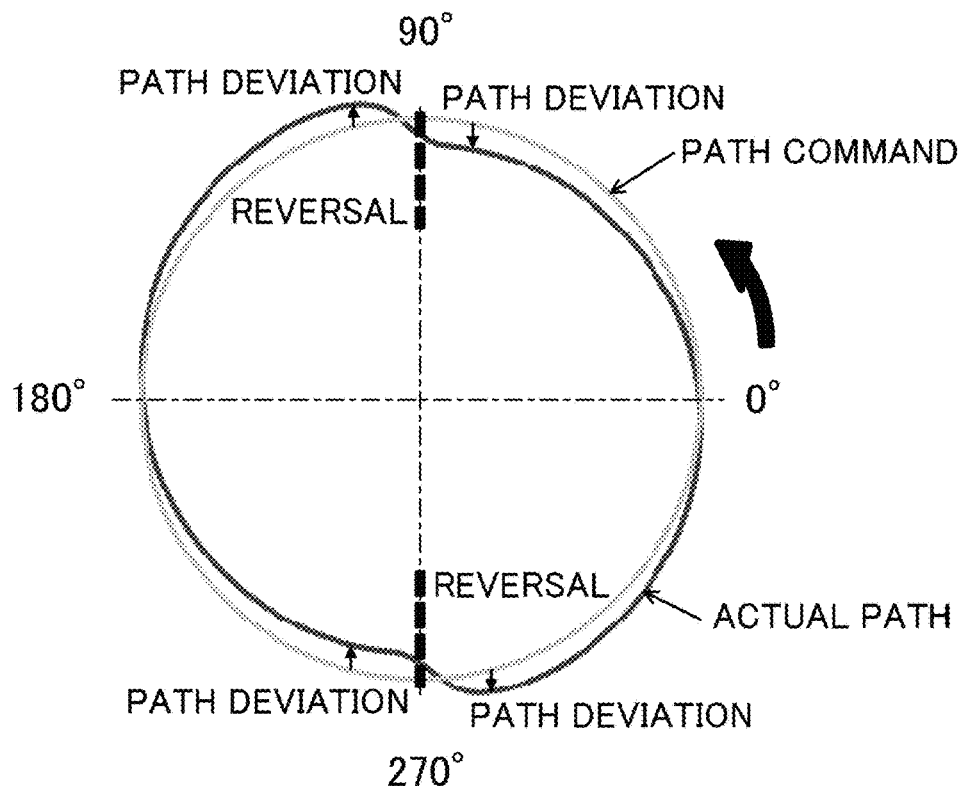
FIG. 2 shows a path deviation occurring while a reverse torque is less than a predetermined threshold value.

Suppose that the operation is, for example, of cutting out a circular workpiece having a diameter of 10 mm at 0.2 m/min as illustrated in FIG. 2. In the example illustrated in FIG. 2, the workpiece is cut out with laser along a circular path in the counterclockwise direction from the 0° position.

In this case, the direction of rotation of the motor 12 of the joint portion J1 is reversed at the timing when the tip of the robot arm 2 reaches the 90° position in FIG. 2 and at the timing when the tip reaches the 270° position in FIG. 2. Thus, backlash errors occur at the 90° and 270° positions.

Specifically, an actual path draws a trajectory in which a portion on the right side with respect to the reversal positions shown in FIG. 2, i.e., a semicircular portion from the 270° position to the 90° position, is shifted down while keeping the diameter unchanged.

A portion on the left side with respect to the reversal positions shown in FIG. 2, i.e., a semicircular portion from the 90° position to the 270° position, is shifted up while keeping the diameter unchanged.

As can be seen, the actual path draws the trajectory in which the right side with respect to the reversal positions in FIG. 2 is shifted down and the left side with respect to the reversal positions in FIG. 2 is shifted up.

Figure 3:
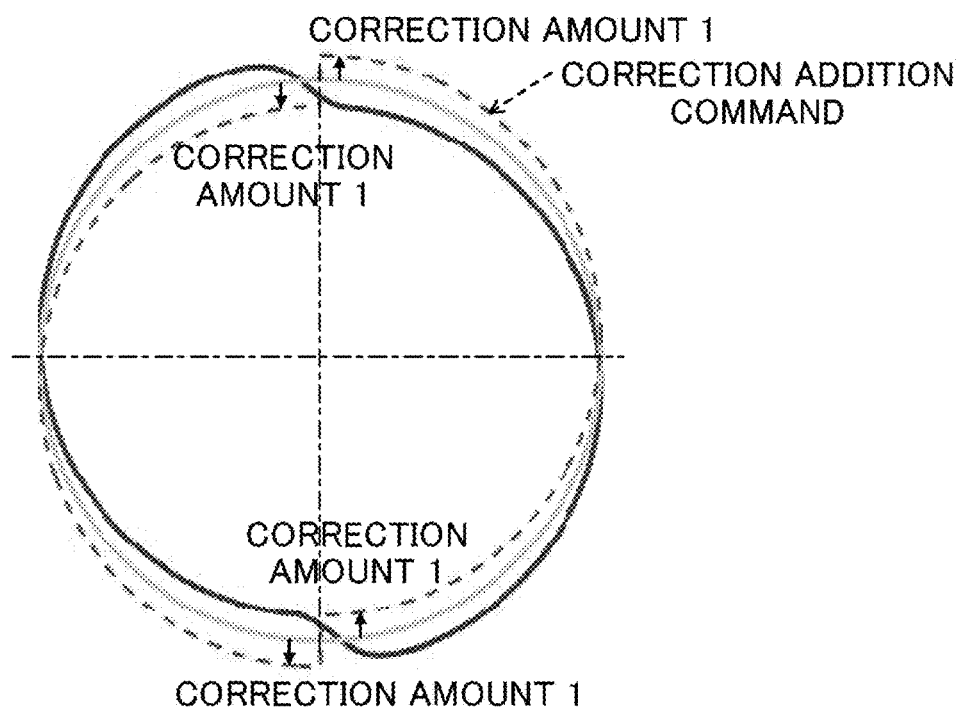
FIG. 3 shows how the path deviation is corrected by only the backlash correction amount.

To address this problem, as illustrated in FIG. 3, the backlash correction amount is added or subtracted to or from a position command, thereby correcting the actual path so as to approach a target path. More specifically, the backlash correction amount (hereinafter also referred to as the "correction amount 1") is added to the position command from the 0° position to the 90° position and from 270° position to the 360° (0°) position, thereby correcting the position command and shifting the path upward as shown in FIG. 3.

On the other hand, the correction amount 1 ($\theta BL1$) is subtracted from the position command from the 90° position to the 270° position, thereby correcting the position command and shifting the path downward as shown in FIG. 3.

Figure 4:
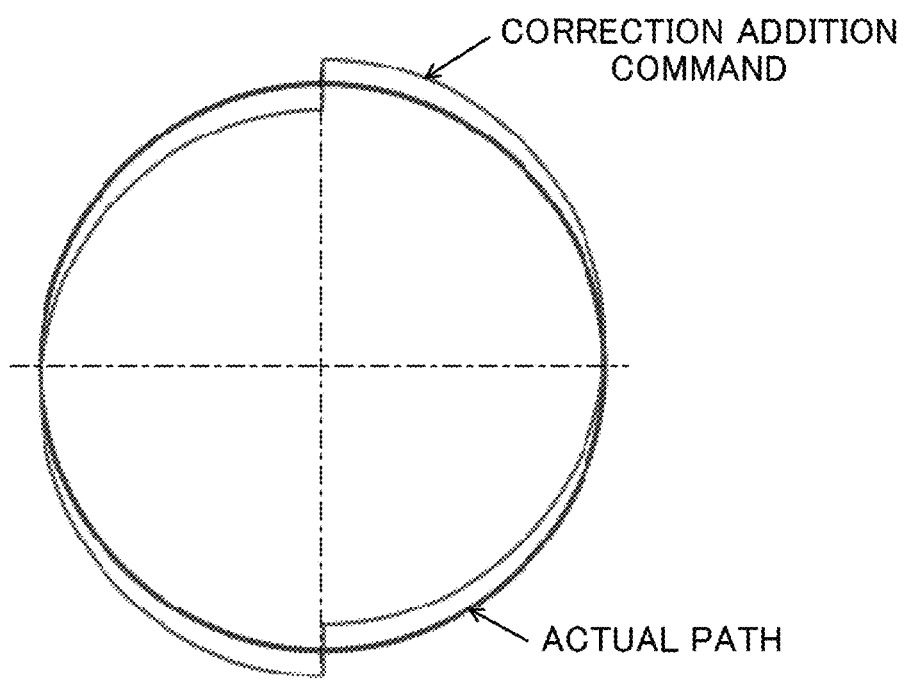
FIG. 4 shows an actual path after correction.

As can be seen, giving a correction addition command as shown in FIG. 4 allows the actual path of the robot arm 2 to be corrected to the circular path.

Figure 5A:
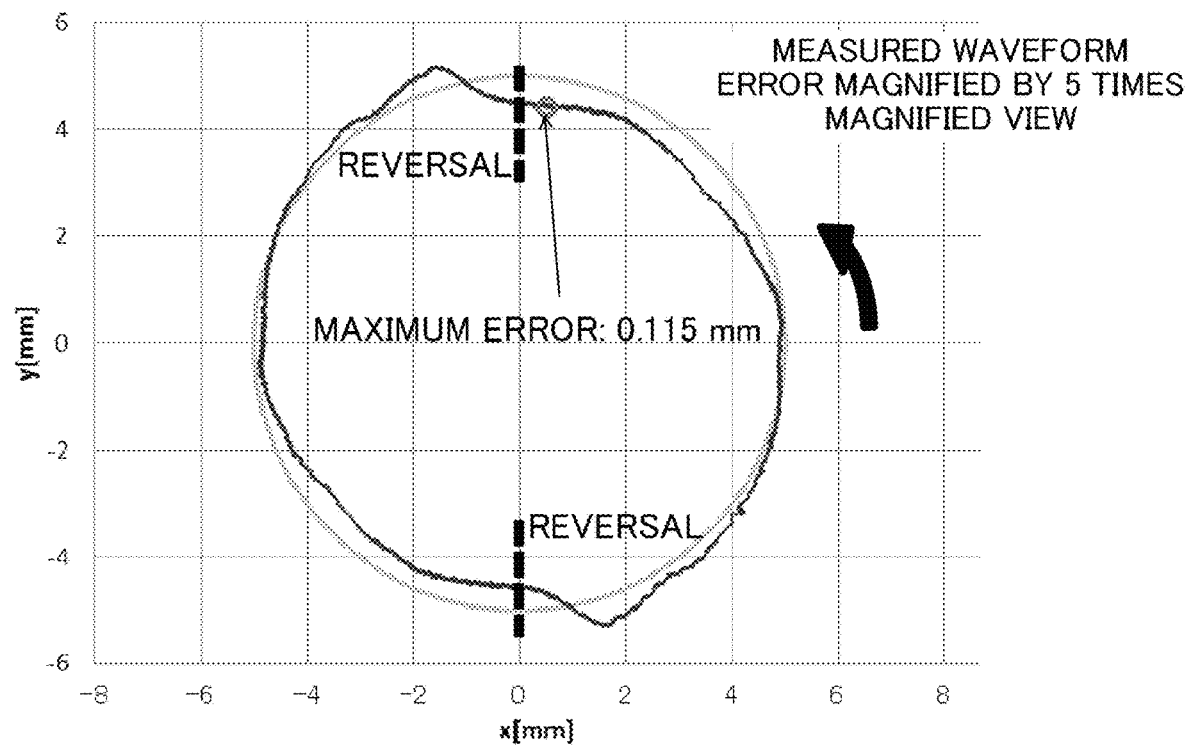
FIG. 5A shows a path deviation before correction.

The degree of changes in the path deviation before and after the correction will now be described with reference to the measurement waveforms shown in FIGS. 5A and 5B. The measurement waveforms shown in FIGS. 5A and 5B each show errors magnified by five times (i.e., deformed) in order to show the shapes of the errors clearly. FIG. 5A shows a maximum error between the target path and the actual path in a case without backlash correction. In the example illustrated in FIG. 5A, the maximum error is 0.115 mm.

Figure 5B:
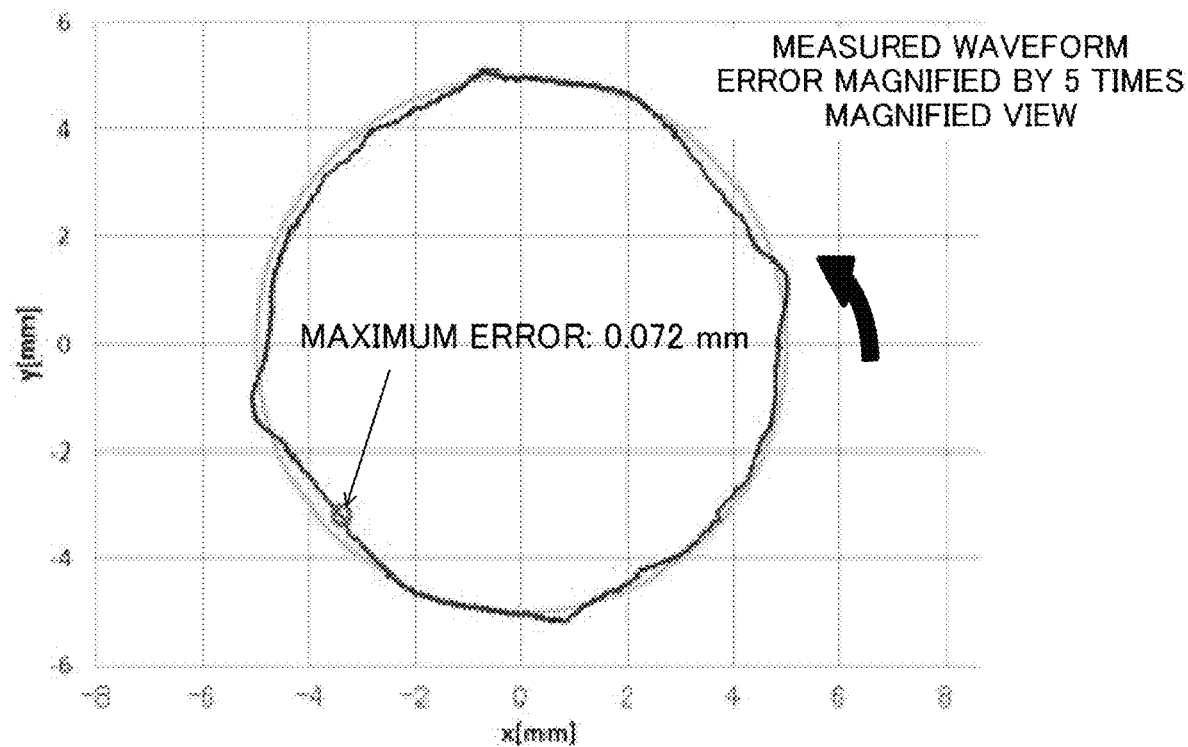
FIG. 5B shows an actual path after correction.

On the other hand, FIG. 5B shows a case with backlash correction, in which the maximum error is reduced to 0.072 mm.

The graphs shown in FIGS. 6A to 6C respectively show changes in command velocity component, kinetic torque, and correction amount over time in the operation of cutting out the circular workpiece having a diameter of 10 mm at 0.2 m/min.

Under the condition where the circular workpiece having a diameter of 10 mm is cut out at 0.2 m/min, the laser cutting speed is relatively low. Thus, the reverse torque τdir does not exceed a predetermined torque threshold value τth as shown in FIG. 6B.

However, an increase in the laser cutting speed may cause the reverse torque τdir to exceed the torque threshold value τth. In this case, merely performing the backlash correction cannot reduce the path error of the robot arm 2 accurately. This will be specifically described below.

Figure 7:
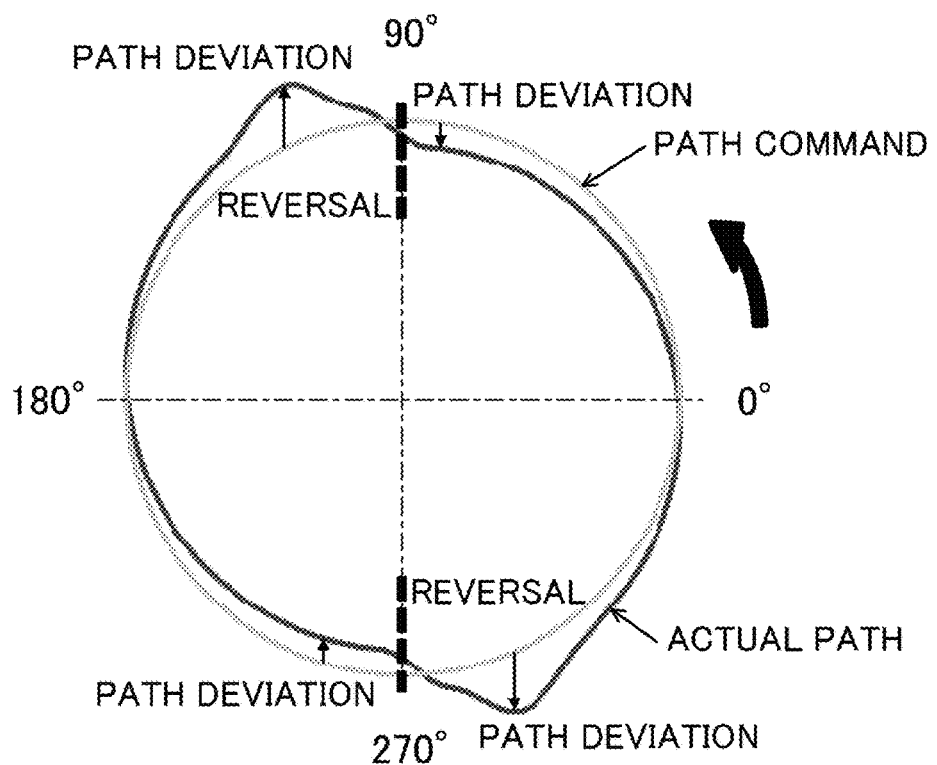
FIG. 7 shows a path deviation occurring while the reverse torque is greater than a predetermined threshold value.

Suppose that the operation is, for example, of cutting out a circular workpiece having a diameter of 10 mm at 2 m/min as illustrated in FIG. 7. In the example illustrated in FIG. 7, the workpiece is cut out with laser along a circular path in the counterclockwise direction from the 0° position.

In this case, the direction of rotation of the motor 12 of the joint portion J1 is reversed at the timing when the tip of the robot arm 2 reaches the 90° position in FIG. 7 and at the timing when the tip reaches the 270° position in FIG. 7. Thus, backlash errors occur at the 90° and 270° positions.

Specifically, just like the foregoing example illustrated in FIG. 2, the actual path draws a trajectory in which the right side with respect to the reversal positions in FIG. 7 is shifted down and the left side with respect to the reversal positions in FIG. 7 is shifted up.

In the example illustrated in FIG. 7, the rotational speed of the motor 12 is high, and the reverse torque increases accordingly. The reverse torque therefore exceeds a predetermined torque threshold value (see also FIG. 11B). As a result, torsion occurs in the speed reducer 13 of the motor 12. This torsion causes the path deviation after the reversal to be greater than the path deviation in the foregoing example illustrated in FIG. 2.

In particular, the distance from the rotational position of the joint portion J1 as the main axis to the tip of the robot arm 2 is long. Thus, even slight torsion of the speed reducer 13 connected to the joint portion J1 causes the center of rotation of the joint portion J1 to fluctuate, and affects the path drawn by the tip of the robot arm 2.

Figure 8:
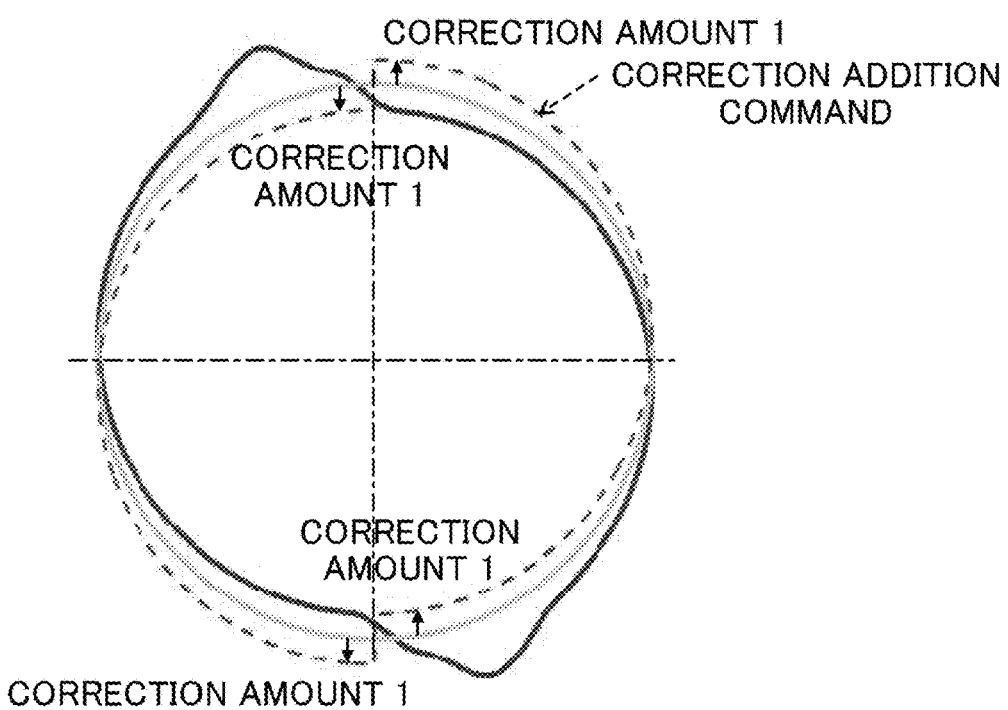
FIG. 8 shows how the path deviation is corrected by only the backlash correction amount.

To address this problem, as described above, the correction amount 1 (θBL1) is added to the position command from the 0° position to the 90° position and from the 270° position to the 360° (0°) position, thereby correcting the position command and shifting the path upward as shown in FIG. 8.

On the other hand, the correction amount 1 (θBL1) is subtracted from the position command from the 90° position to the 270° position, thereby correcting the position command and shifting the path downward as shown in FIG. 8.

Figure 9:
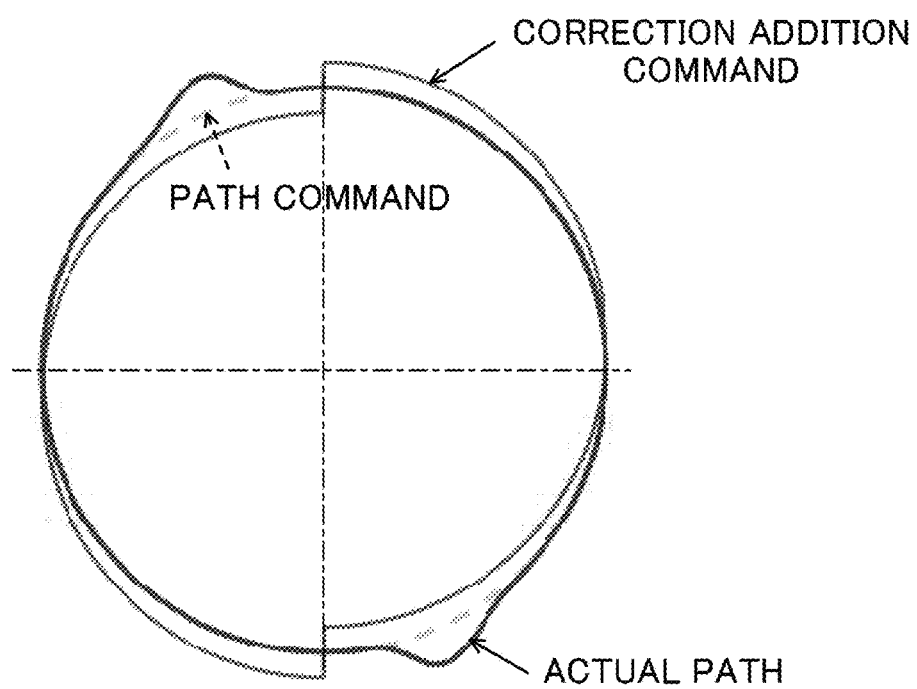
FIG. 9 shows an actual path after correction.

However, in the example illustrated in FIG. 8, a torsion error occurs in addition to a backlash error. Thus, even if a correction addition command shown in FIG. 9 is given to carry out only backlash correction, the actual path of the robot arm 2 does not form a circular path, but has the shape that swells outward from the circular path at portions past the reversal positions.

Figure 10A:
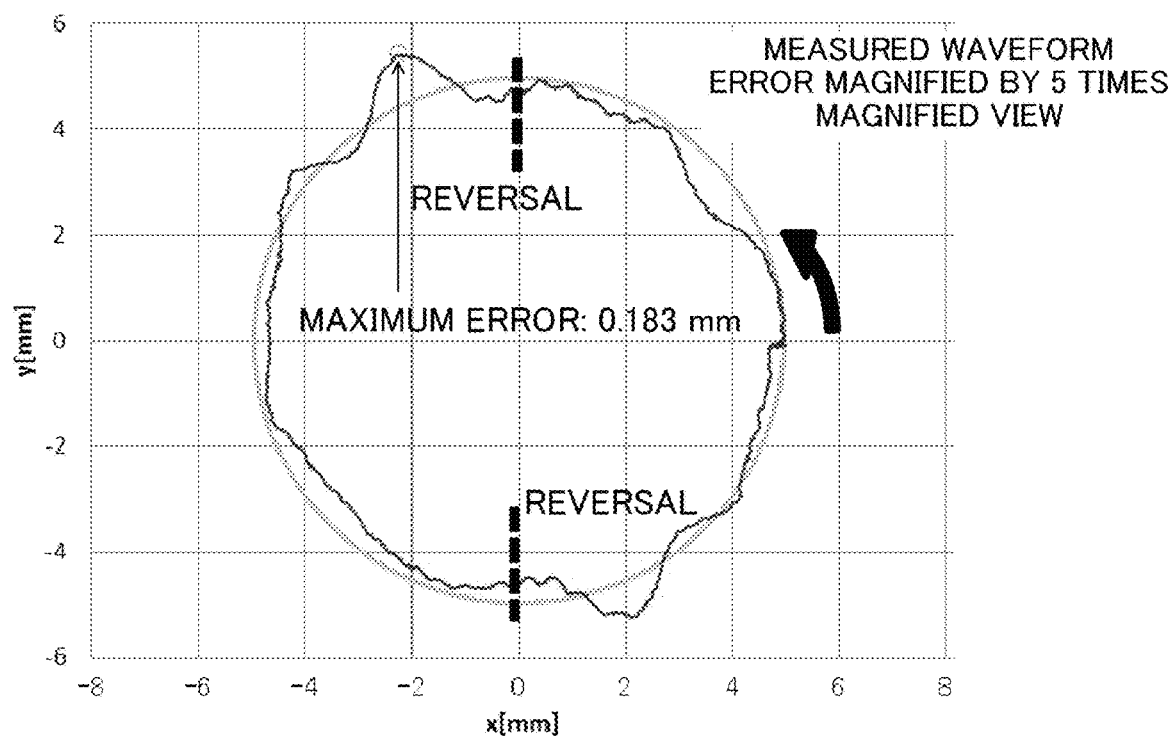
FIG. 10A shows a path deviation before correction.

The degree of changes in the path deviation before and after the correction will now be described with reference to the measurement waveforms shown in FIGS. 10A and 10B. The measurement waveforms shown in FIGS. 10A and 10B each show errors magnified by five times (i.e., deformed) in order to show the shapes of the errors clearly. FIG. 10A shows a maximum error between the target path and the actual path in a case without backlash correction. In the example illustrated in FIG. 10A, the maximum error is 0.183 mm.

Figure 10B:
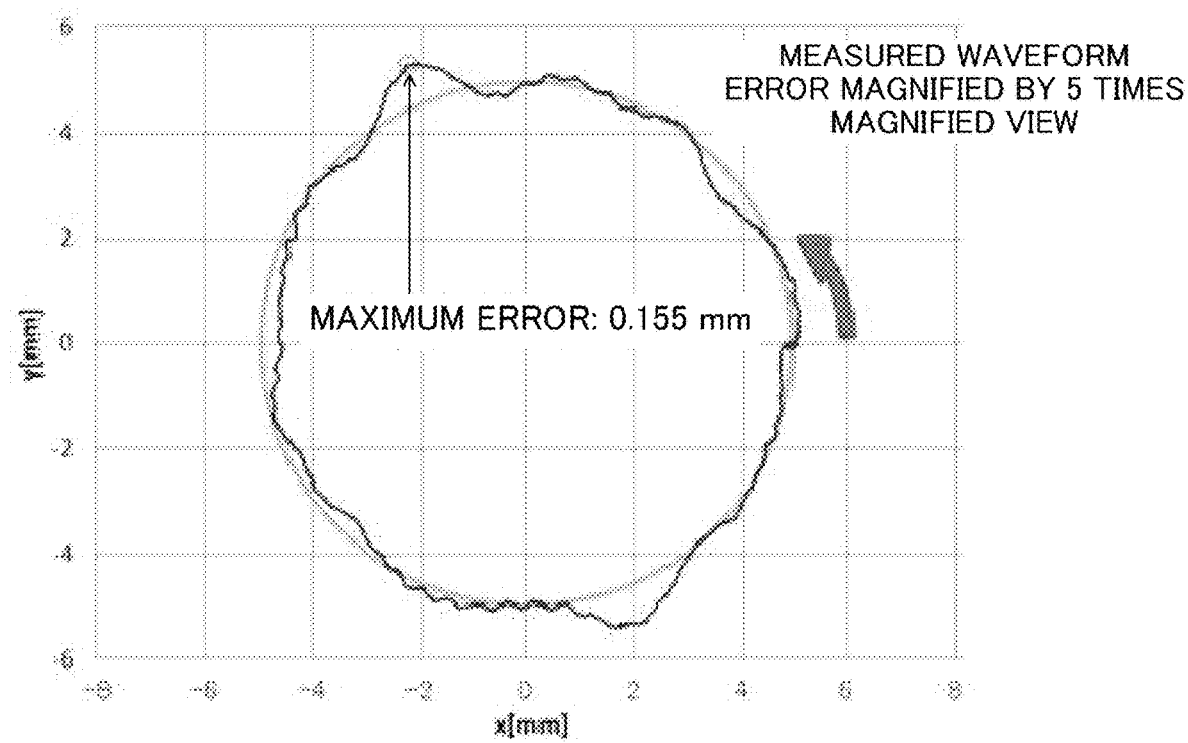
FIG. 10B shows an actual path after correction.

On the other hand, FIG. 10B shows a case with backlash correction, in which the maximum error is 0.155 mm. The path deviation is not reduced enough.

Figure 11A:
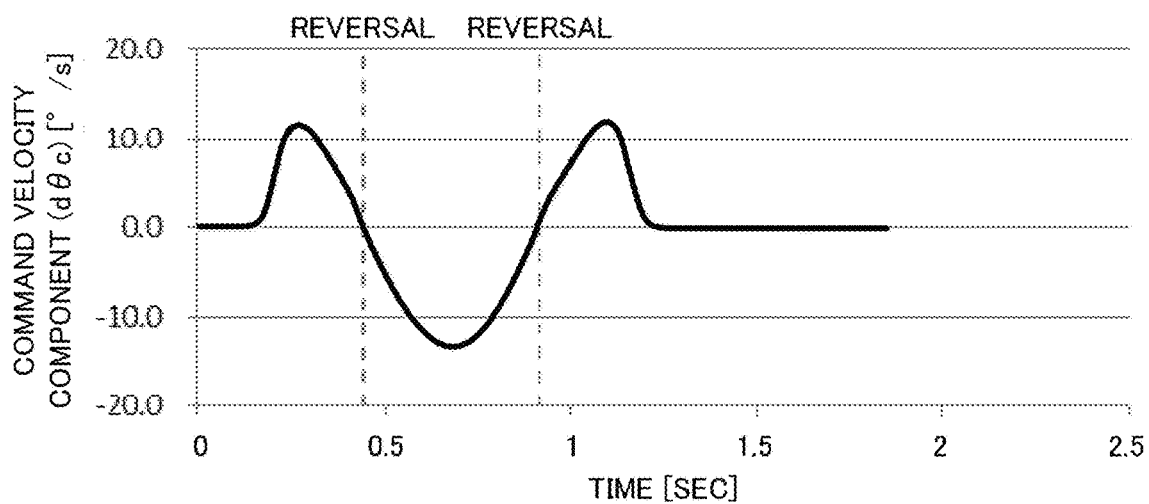
FIG. 11A is a graph showing variations in command velocity component.
Figure 11B:
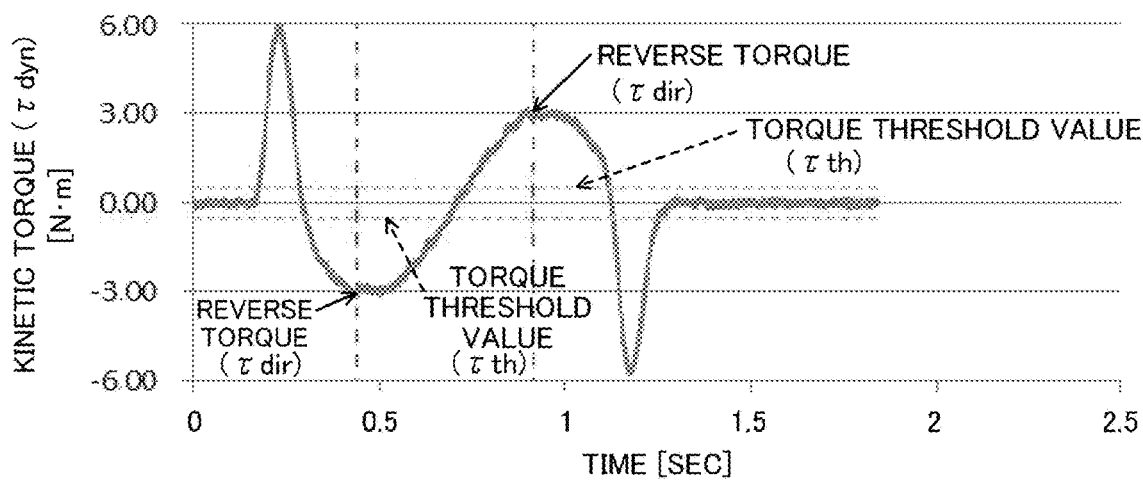
FIG. 11B is a graph showing variations in kinetic torque.
Figure 11C:
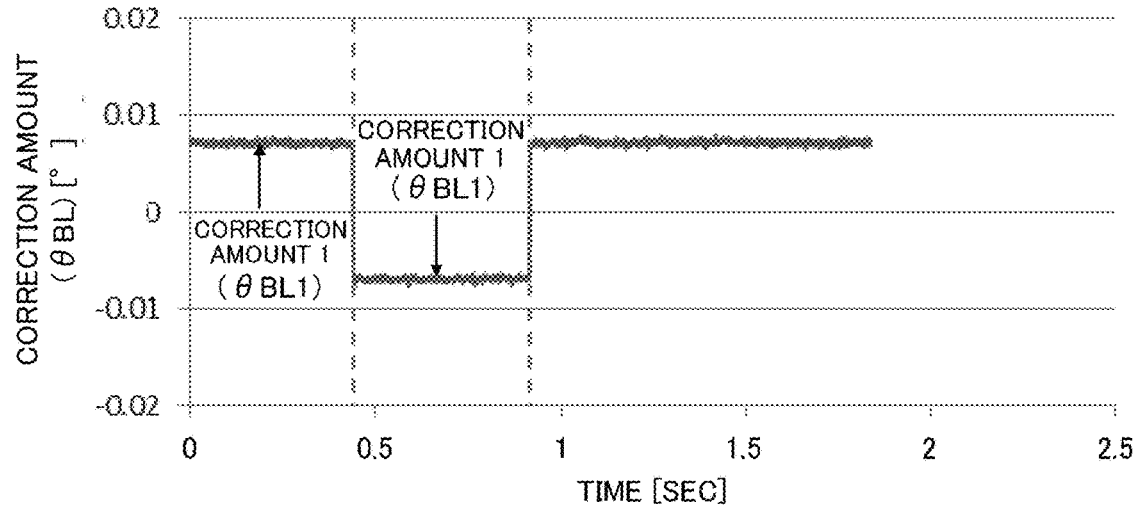
FIG. 11C is a graph showing variations in correction amount.

The graphs shown in FIGS. 11A to 11C respectively show changes in command velocity component, kinetic torque, and correction amount over time in the operation of cutting out the circular workpiece having a diameter of 10 mm at 2 m/min.

Under the condition where the circular workpiece having a diameter of 10 mm is cut out at 2 m/min, the laser cutting speed is high. Thus, the reverse torque τdir exceeds the predetermined torque threshold value τth as shown in FIG. 11B.

Thus, in this embodiment, in the case in which the reverse torque is greater than the predetermined threshold value, torsion correction is performed together with backlash correction to make it possible to reduce the path error of the robot arm 2. Specific procedures of such correction will be described below.

<Configurations of Articulated Robot and Control System for Same>

Figure 12:
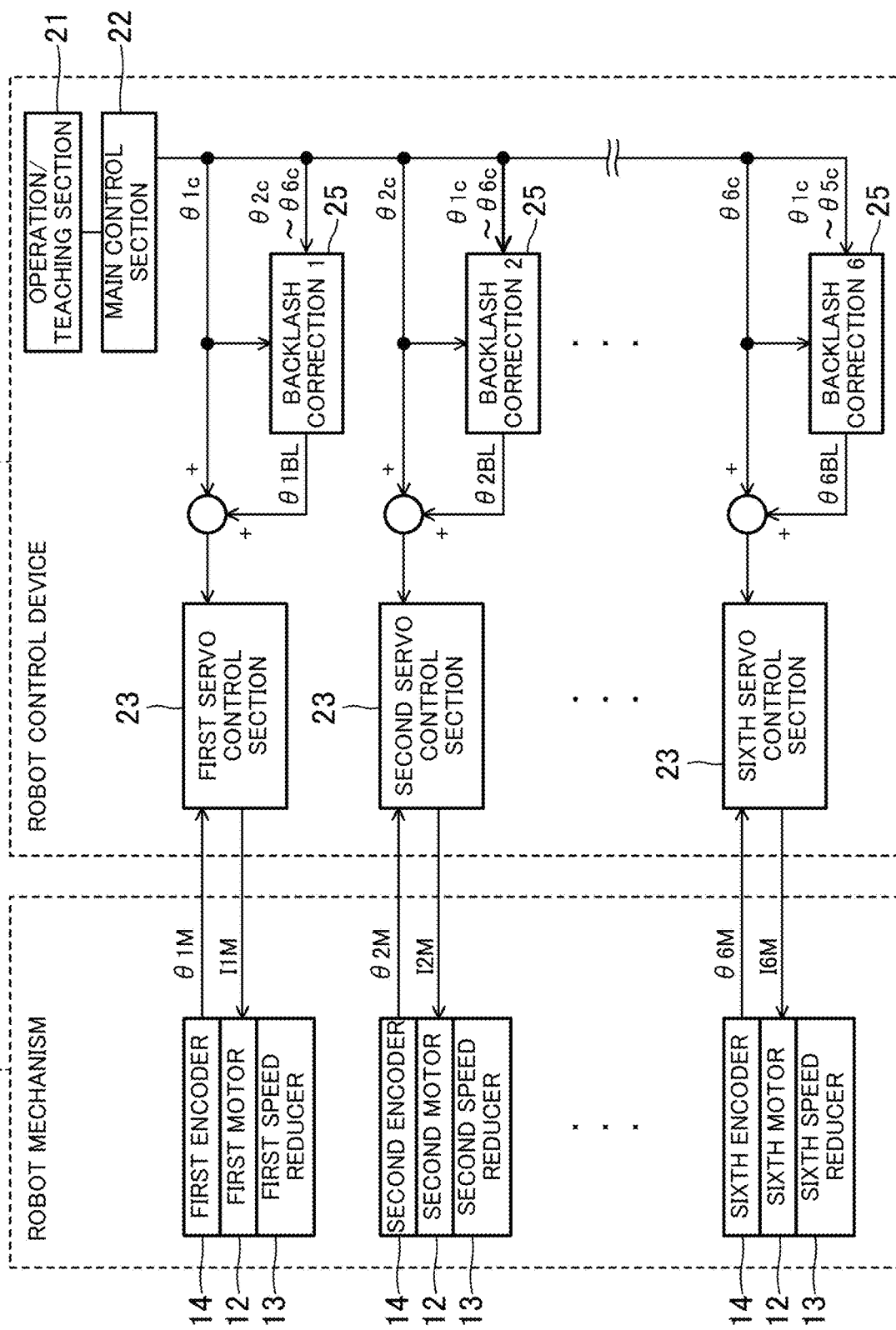
FIG. 12 is a functional block diagram relating to position control of the robot.

FIG. 12 is a functional block diagram relating to position control of a robot, and schematically shows internal configurations of a robot mechanism 11 and the robot control device 20.

As shown in FIG. 12, the robot mechanism 11 is a mechanical driving section of the robot 1, and includes the servomotors 12 (hereinafter simply referred to as "motors"), the speed reducers 13, and encoders 14. Although not illustrated, the robot mechanism 11 also includes the robot arm 2.

The motors 12 are connected to the respective joint portions J1 to J6 of the robot 1 through the speed reducers 13, and drive the joint portions J1 to J6 based on control signals transmitted from respective servo control sections 23 of the robot control device 20, thereby controlling the motion and posture of the robot arm 2. The robot 1 has its joint portions J1 to J6 operated so that the tip of the robot arm 2 draw an intended path, such as a circular path, an elliptic path, or a path of any other shape.

The encoders 14 are connected to the respective motors 12, and detect the rotation amount and rotational speed of the respective motors 12. The detection signal is transmitted as a feedback signal to the respective servo control sections 23.

Note that in the following description, the motor 12, the speed reducer 13, and the encoder 14 connected to the joint portion J1 may be referred to as a the "first motor," the "first speed reducer," and the "first encoder," respectively, and the other motors connected to the joint portions J2 to J6, for example, may be referred to as the "second to sixth motors."

Further, the servo control section 23 and a backlash correction block 25 connected to the first motor may be referred to as the "first servo control section" and the "first backlash correction block," respectively, and the other servo control sections 23 connected to the second to sixth motors 12 and the other backlash correction blocks 25 connected to the second to sixth servo control sections 23 may be referred to as the "second to sixth servo control sections" and the "second to sixth backlash correction blocks," respectively.

Further, the position commands and position command correction values transmitted to the respective axes may be referred to as the "position commands θ1c to θ6c" and the "position command correction values θ1BL to θ6BL."

The robot control device 20 includes an operation/teaching section 21, a main control section 22, the servo control sections 23, and the backlash correction blocks 25.

The operation/teaching section 21 stores, for example, a path of the robot arm 2 acquired during teaching, and rotary motions and other motions of the motors 12 for drawing this path.

The main control section 22 receives an instruction from the operation/teaching section 21, and outputs the position commands $\theta 1c$ to $\theta 6c$ of the axes J1 to J6 of the robot 1 in accordance with the path along which the robot arm 2 or any other component of the robot mechanism 11 moves and which is stored in the operation/teaching section 21.

The servo control sections 23 respectively control rotary motions of the first to sixth motors 12 in the robot mechanism 11 so that the rotary motions follow the position commands $\theta 1c$ to $\theta 6c$ transmitted from the main control section 22.

The backlash correction blocks 25 are provided between the main control section 22 and the servo control sections 23, and correspond to the respective joint portions J1 to J6. The backlash correction blocks 25 generate the position command correction values $\theta 1BL$ to $\theta 6BL$ based on the position commands $\theta 1c$ to $\theta 6c$, respectively, received from the main control section 22. The position command correction values $\theta 1BL$ to $\theta 6BL$ generated are added to the associated position commands $\theta 1c$ to $\theta 6c$, and the resultant commands are transmitted to the first to sixth servo control sections 23, respectively.

Note that functional blocks in the robot control device 20 may be configured as independent circuits, or may be configured as one integrated circuit. A combination of some of the functional blocks may be configured as one integrated circuit.

The functions of the main control section 22, the servo control sections 23, and the backlash correction blocks 25 are generally implemented through execution of a program written in software on an integrated circuit, such as a CPU.

Figure 13:
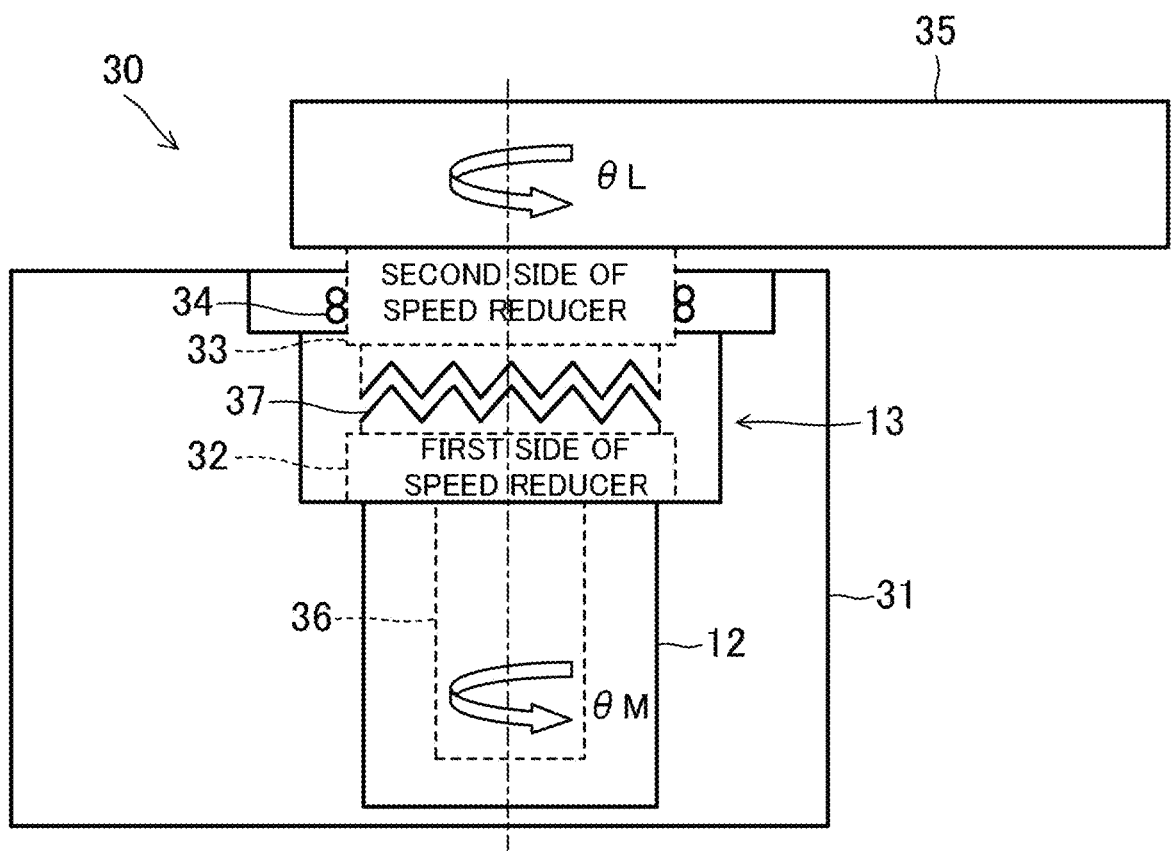
FIG. 13 is a diagram for illustrating torsion of a speed reducer of a robot arm.

FIG. 13 shows one of the motors 12, an associated one of the speed reducers 13, and a portion of the robot arm 2 connected to these components, which are extracted as a load 30 from the robot mechanism 11.

The load 30 includes a first arm 31 serving as a motor mounting base, the motor 12 connected to the first arm 31, the speed reducer 13, and a second arm 35. The speed reducer 13 includes a first side 32 connected to the motor 12, and a second side 33 provided with a bearing 34. The second arm 35 is rotatably connected to the second side 33 of the speed reducer 13.

The first side 32 of the speed reducer is coupled to a rotor 36 of the motor 12 via a rotation shaft of the motor 12, and rotates by the amount of the motor rotation position OM transmitted from the servo control section 23. The speed reducer 13 converts the motor rotation position OM into an arm rotation position $\theta L$ at a reduction ratio Rg. The speed reducer 13 includes a spring component 37 between the first side 32 and the second side 33 of the speed reducer 13.

The position command $\theta c$ indicates an angle command that instructs an angular amount of rotation of each axis. The actual position $\theta L$ indicates the actual angular amount of rotation of each axis.

<Detailed Configurations of Control Blocks of Articulated Robot>

Figure 14:
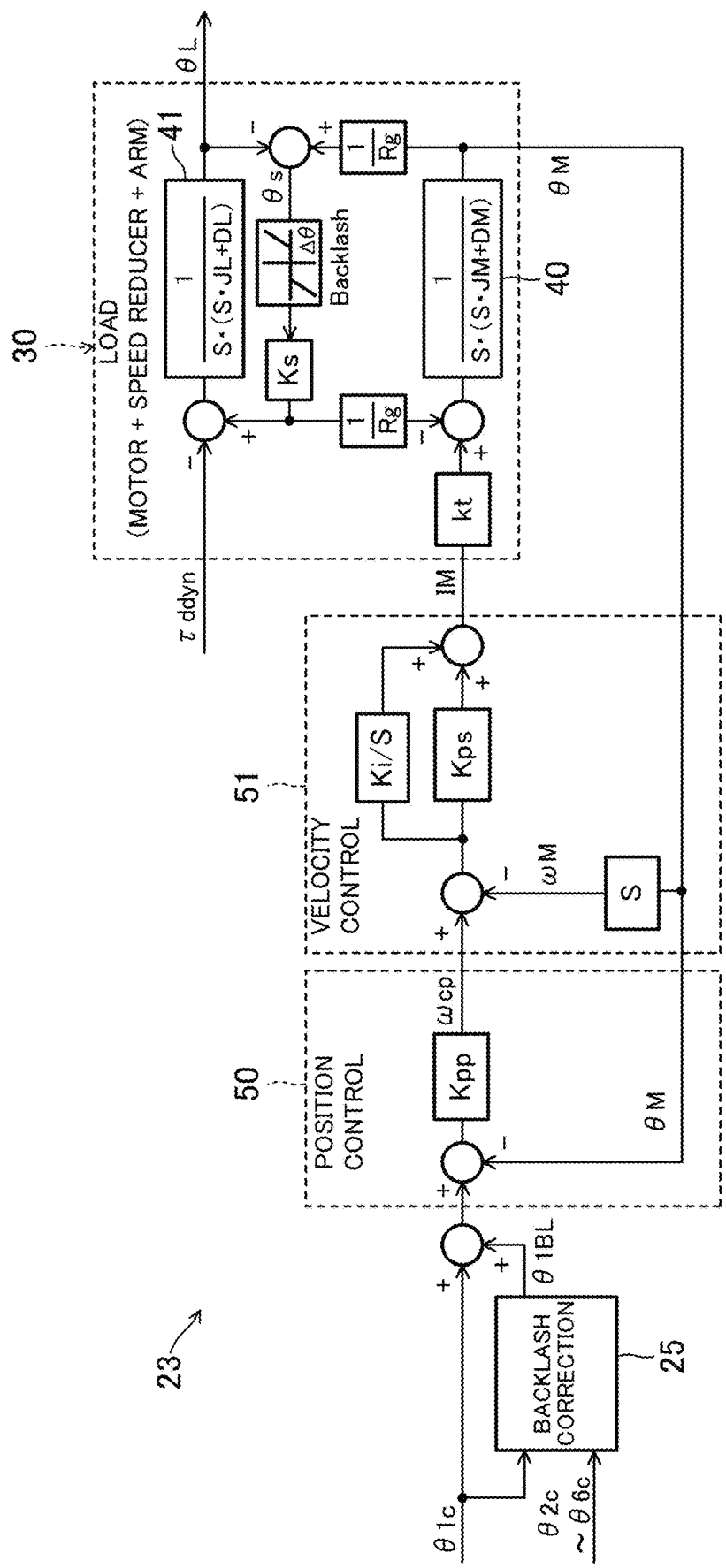
FIG. 14 is a block diagram of a robot control device.

FIG. 14 shows a block diagram of the first servo control section. As shown in FIG. 14, in a position control block 50 of the servo control section 23, the motor position OM is subtracted from the sum of the position command $\theta c$ and the backlash correction value $\theta BL$ output from the backlash correction block 25, and the resultant value is multiplied by a position proportional gain Kpp to generate a velocity command wcp. The motor position $\theta M$ is obtained based on the detection signal from the first encoder 14 serving as a position detector.

Note that, in the following description, features of the first servo control section 23 are used as examples. The same statement applies to the second to sixth servo control sections 23.

In a velocity control block 51, a current IM to flow through the first motor 12 is calculated as follows: a motor velocity ωM, obtained by differentiating the motor position $\theta M$, is subtracted from the velocity command ωcp; the resultant value is multiplied by the velocity proportional gain Kps; and the thus obtained value and a value obtained by integrating said resultant value of the subtraction and multiplying the result by the velocity integral gain Ki are added together, thereby obtaining the current IM. The current IM is input to the load 30.

In the load 30, IM represents a motor current command for driving the motor 12; Kt represents a torque constant of the motor 12; 1/Rg represents the reciprocal of the reduction ratio; Ks represents a spring constant of the speed reducer 13; $\theta s$ represents the amount of torsion occurring between the first side 32 and the second side 33 of the speed reducer; and τddyn represents a kinetic torque applied to the robot arm 2.

A motor transfer function 40 and a load transfer function 41 are obtained by mathematizing (modeling) respective physical phenomena.

In the motor transfer function 40, JM represents the moment of inertia around the rotation axis of a combination of the rotor 36 of the motor 12 and the first side 32 of the speed reducer, and DM represents the viscous friction coefficient.

In the load transfer function 41, JL represents the moment of inertia around the rotation axis of a combination of the second arm 35 and the second side 33 of the speed reducer, and DL represents the viscous friction coefficient.

FIG. 14 is a typical control block diagram of the motor connected to the load and the speed reducer. Thus, functions other than those described above will not be described in detail.

Figure 15:
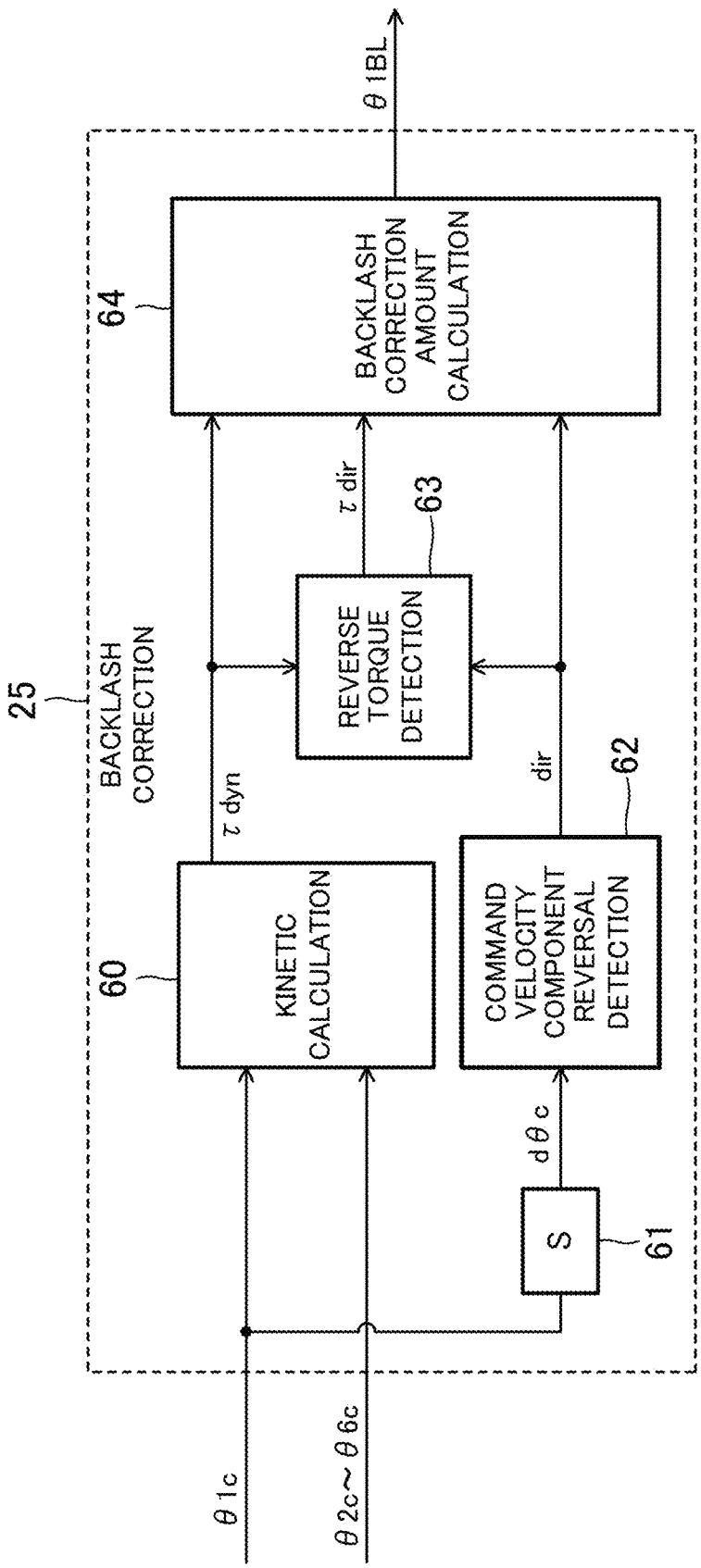
FIG. 15 is a block diagram of a backlash correction block.

FIG. 15 shows detailed configurations of a backlash correction block. The backlash correction block 25 includes a kinetic calculation block 60, an angular velocity calculation block 61, a command velocity component reversal detection block 62, a reverse torque detection block 63, and a backlash correction amount calculation block 64.

In the kinetic calculation block 60, the kinetic torque τdyn is calculated using the position commands $\theta 1c$ to $\theta 6c$ transmitted to all of the axes from the main control section 22. In the kinetic calculation block 60, the kinetic torque τdyn applied to each axis is calculated by performing a kinetic calculation using the position commands $\theta 1c$ to $\theta 6$ of all of the axes, velocity components obtained by differentiation of the position commands, and acceleration components obtained by second-order differentiation of the position commands.

In the angular velocity calculation block 61, an angular velocity component dθc is calculated by differentiation of the position command $\theta 1c$ (which is a correction target) for the joint portion J1. The angular velocity component dθc obtained is input to the command velocity component reversal detection block 62. In the command velocity component reversal detection block 62, the reversal timing dir is calculated based on the angular velocity component dθc. The reversal timing dir is input to the reverse torque detection block 63 and the backlash correction amount calculation block 64.

In the reverse torque detection block 63, the reverse torque τdir is calculated based on the kinetic torque τdyn and the reversal timing dir.

In the backlash correction amount calculation block 64, the correction amount θ1BL of the joint portion J1 is calculated based on the kinetic torque τdyn, the reverse torque τdir, and the reversal timing dir.

In a case of performing only backlash correction, a waveform including the backlash correction amount (correction amount 1 (θBL1)) shown in FIG. 6C, for example, is output as the correction amount θ1BL. The backlash correction amount is a value determined in advance by an experiment or any other factor.

On the other hand, in a case of performing backlash correction and torsion correction, a waveform including the correction amount 1 (θBL1), the torsion correction amount (correction amount 2 (θBL2)), and the correction time tBL2 shown in FIG. 20C described below, for example, is output as the correction amount θ1BL.

The correction amount θ1BL calculated in the backlash correction amount calculation block 64 is incorporated in the position command dθc to be transmitted to the first servo control section 23 from the main control section 22. The thus obtained new position command is input to the first servo control section 23 so that the servo control section 23 control the driving of the first motor 12.

The first servo control section 23 adjusts the correction amount in accordance with the magnitude of the reverse torque τdir. Specifically, in the case of the above-described operation of cutting out the circular workpiece having a diameter of 10 mm at 0.2 m/min (see FIG. 2), the influence of the torsion that occurs at the joint portion J1 is small because the reverse torque τdir is smaller than the predetermined torque threshold value τth (see FIG. 6B). Thus, only backlash correction is needed.

On the other hand, in the case of the above-described operation of cutting out the circular workpiece having a diameter of 10 mm at 2 m/min (see FIG. 7), the influence of the torsion that occurs at the joint portion J1 is significant because the reverse torque τdir is larger than the predetermined torque threshold value τth (see FIG. 11B). Thus, torsion correction is needed in addition to the backlash correction.

Figure 16:
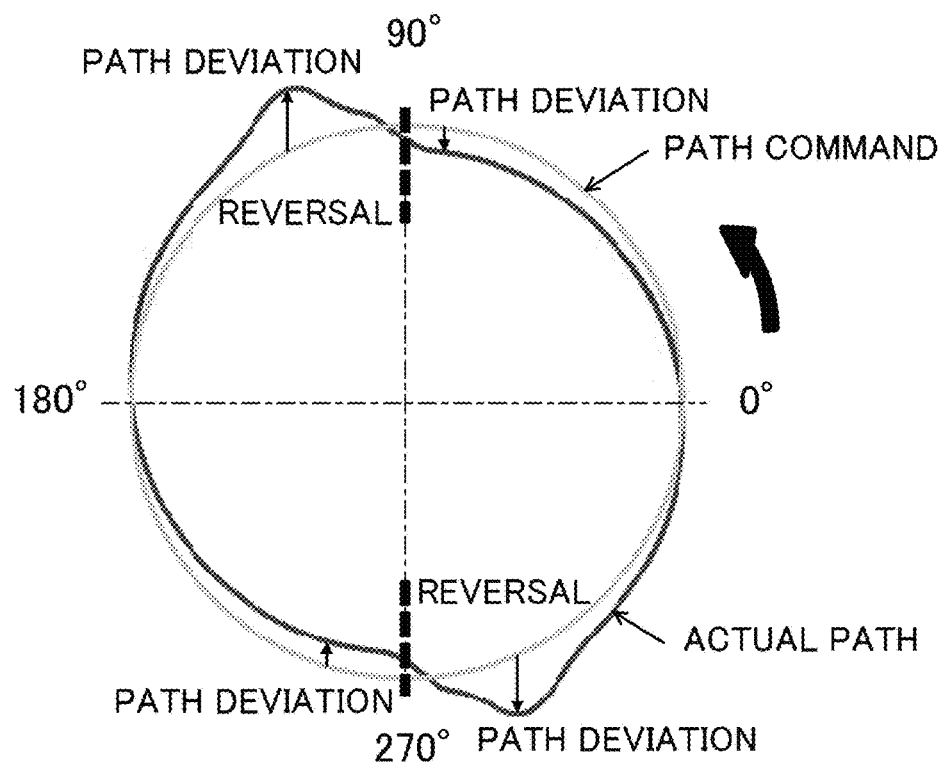
FIG. 16 shows a path deviation occurring while a reverse torque is greater than a predetermined threshold value.

Suppose that the operation is, for example, of cutting out a circular workpiece having a diameter of 10 mm at 2 m/min as illustrated in FIG. 16. In the example illustrated in FIG. 16, the workpiece is cut out with laser along a circular path in the counterclockwise direction from the 0° position.

In this case, the direction of rotation of the motor 12 of the joint portion J1 is reversed at the timing when the tip of the robot arm 2 reaches the 90° position in FIG. 16 and at the timing when the tip reaches the 270° position in FIG. 16. Backlash errors therefore occur at the 90° and 270° positions.

Specifically, just like the foregoing example illustrated in FIG. 7, the actual path draws a trajectory in which the right side with respect to the reversal positions in FIG. 16 is shifted down and the left side with respect to the reversal positions in FIG. 16 is shifted up.

In the example illustrated in FIG. 16, the rotational speed of the motor 12 is high, and the reverse torque increases accordingly. The reverse torque therefore exceeds a predetermined torque threshold value (see also FIG. 20B). As a result, torsion occurs in the speed reducer 13 of the motor 12. The path deviation after the reversal is further increased due to this torsion.

Figure 17:
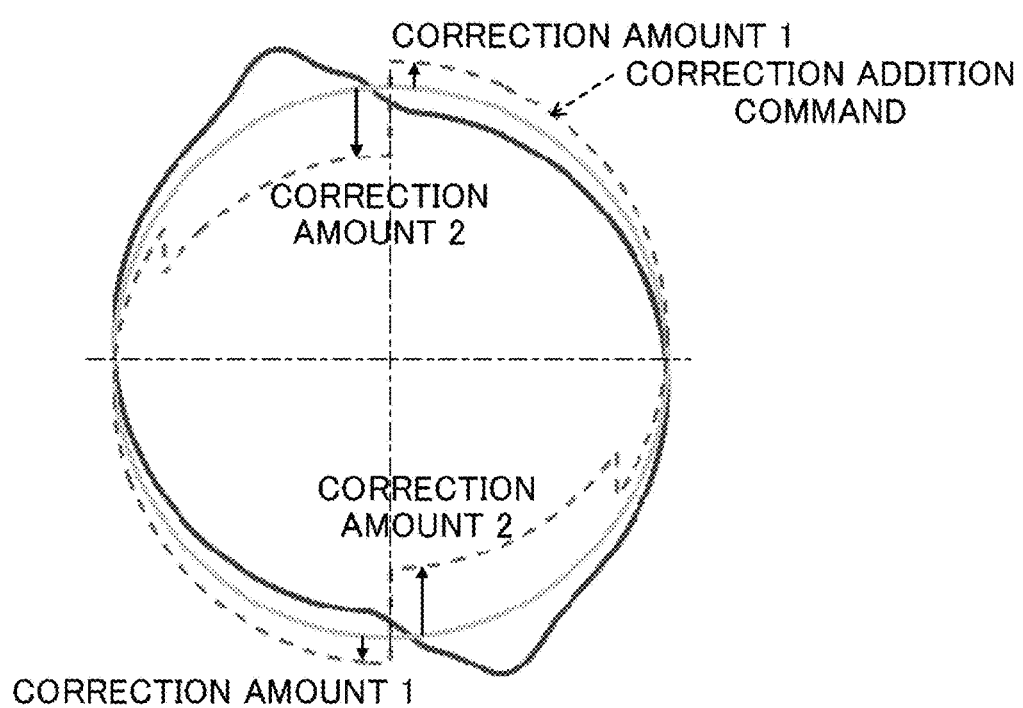
FIG. 17 shows how the path deviation is corrected by the backlash correction amount and the torsion correction amount.

To address this problem, as illustrated in FIG. 17, the backlash correction amount (correction amount 1) and the torsion correction amount (hereinafter referred to as the "correction amount 2") are added or subtracted to or from a position command, thereby correcting the actual path so as to approach a target path.

First, the correction amount 1 (θBL1) is added to the position command from the 0° position to the 90° position, thereby correcting the position command and shifting the path upward as shown in FIG. 17.

On the other hand, the correction amount 1 (θBL1) is subtracted from the position command from the 90° position to the 270° position, thereby correcting the position command and shifting the path downward as shown in FIG. 17. In this case, in the section from the 90° position to the 180° position that is immediately after the reversal of the motor 12, the correction amount 2 (θBL2) greater than the correction amount 1 (θBL1) is subtracted from the position command from after the reversal of the motor 12 until an elapse of the predetermined correction time tBL2, thereby correcting the position command and shifting the path further downward.

Further, the correction amount 1 (θBL1) is added to the position command from the 270° position to the 360° (0°) position, thereby correcting the position command and shifting the path upward as shown in FIG. 17. In this case, in the section from the 270° position to the) 360° (0° position that is immediately after the reversal of the motor 12, the correction amount 2 (θBL2) greater than the correction amount 1 (θBL1) is added to the position command from after the reversal of the motor 12 until an elapse of the predetermined correction time tBL2, thereby correcting the position command and shifting the path further upward.

Figure 18:
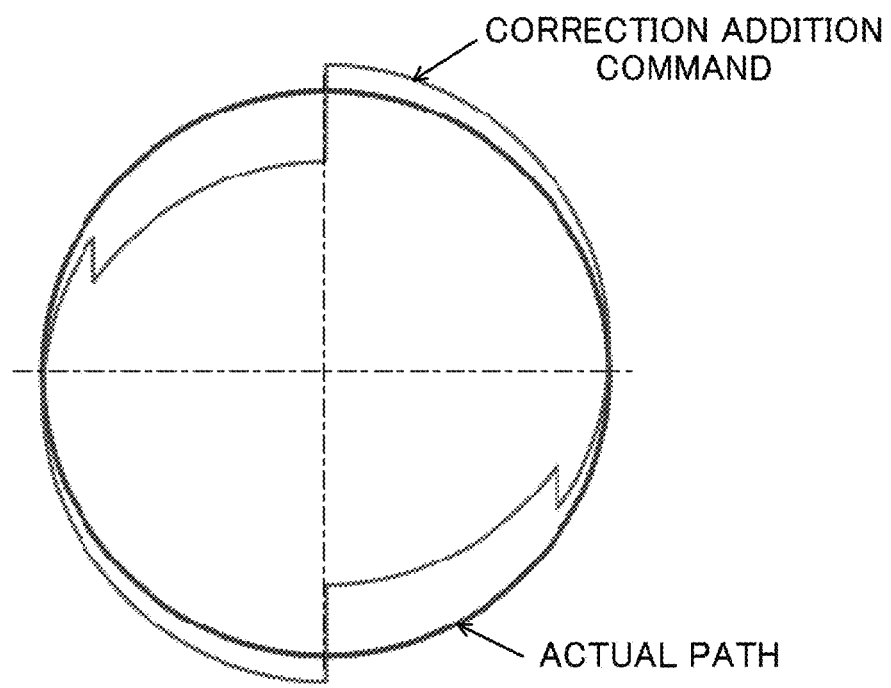
FIG. 18 shows an actual path after correction.

As can be seen, giving a correction addition command as shown in FIG. 18 allows the actual path of the robot arm 2 to be corrected to the circular path.

Figure 19A:
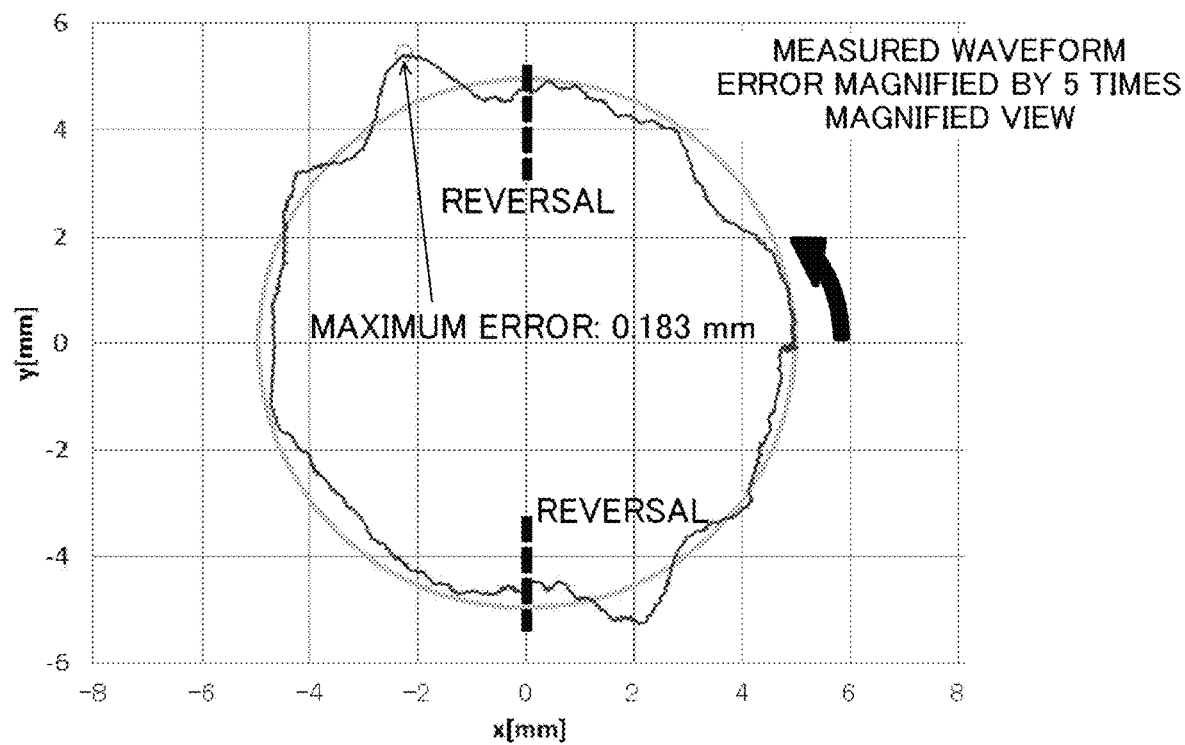
FIG. 19A shows a path deviation before correction.

The degree of changes in the path deviation before and after the correction will now be described with reference to the measurement waveforms shown in FIGS. 19A and 19B. The measurement waveforms shown in FIGS. 19A and 19B each show errors magnified by five times (i.e., deformed) in order to show the shapes of the errors clearly. FIG. 19A shows a maximum error between the target path and the actual path in a case without backlash correction. In the example illustrated in FIG. 19A, the maximum error is 0.183 mm.

Figure 19B:
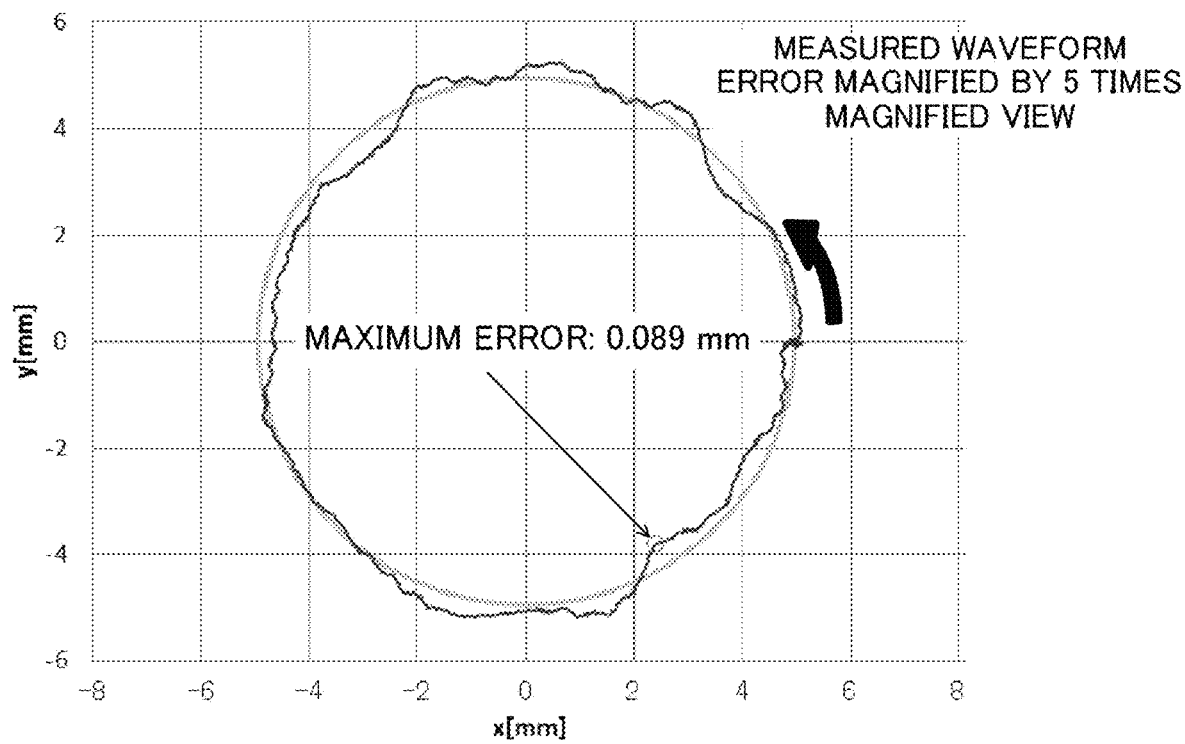
FIG. 19B shows an actual path after correction.

On the other hand, FIG. 19B shows a case with backlash correction, in which the maximum error is reduced to 0.089 mm.

Figure 20A:
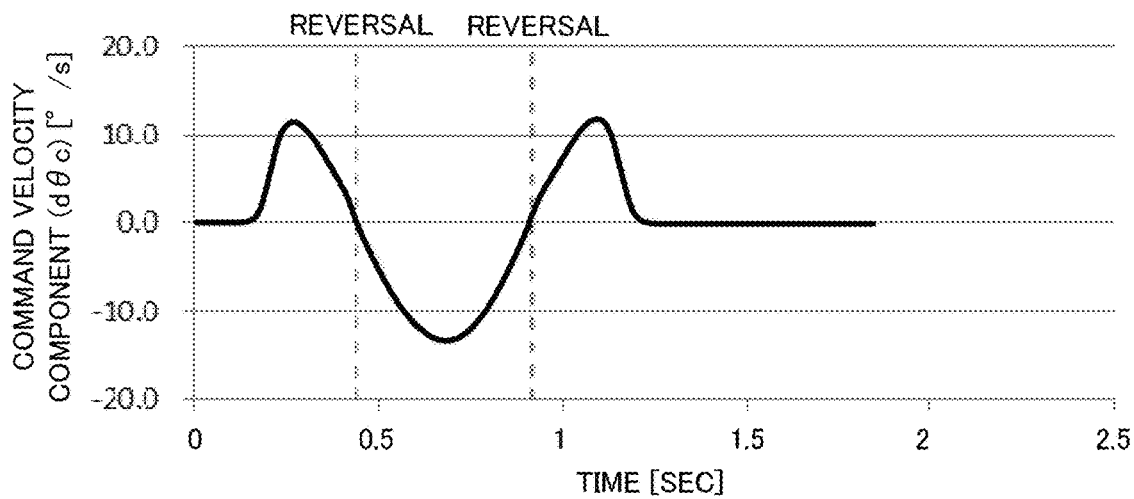
FIG. 20A is a graph showing variations in command velocity component.
Figure 20B:
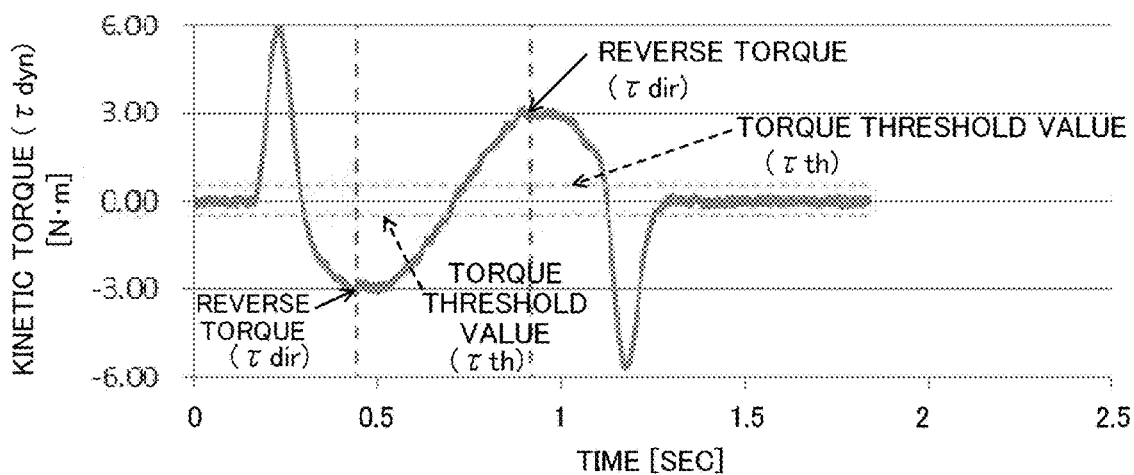
FIG. 20B is a graph showing variations in kinetic torque.
Figure 20C:
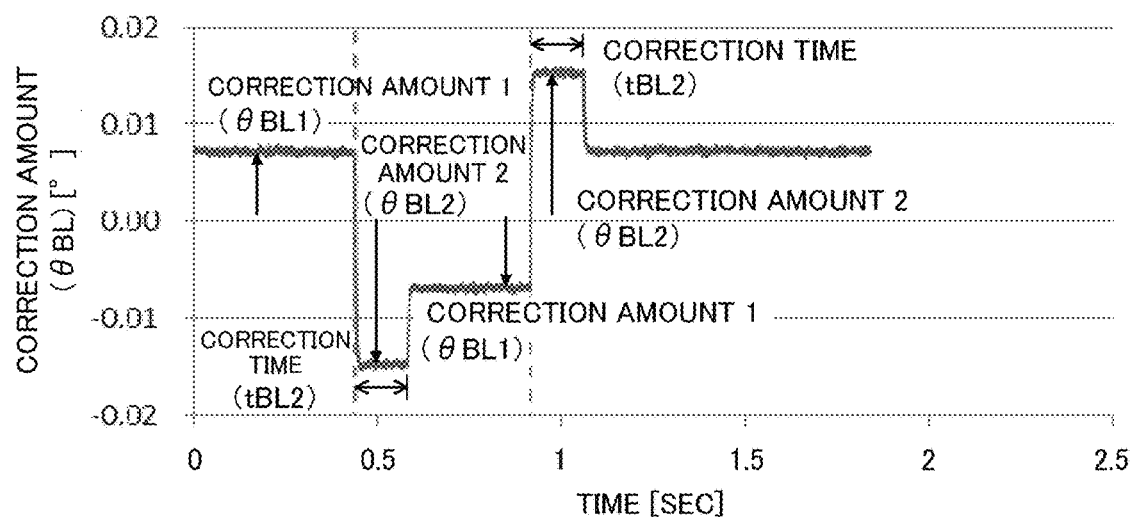
FIG. 20C is a graph showing variations in correction amount.

The graphs shown in FIGS. 20A to 20C respectively show changes in command velocity component, kinetic torque, and correction amount over time in the operation of cutting out the circular workpiece having a diameter of 10 mm at 2 m/min.

Under the condition where the circular workpiece having a diameter of 10 mm is cut out at 2 m/min, the laser cutting speed is high. Thus, the reverse torque τdir exceeds the predetermined torque threshold value τth as shown in FIG. 20B.

Figure 21:
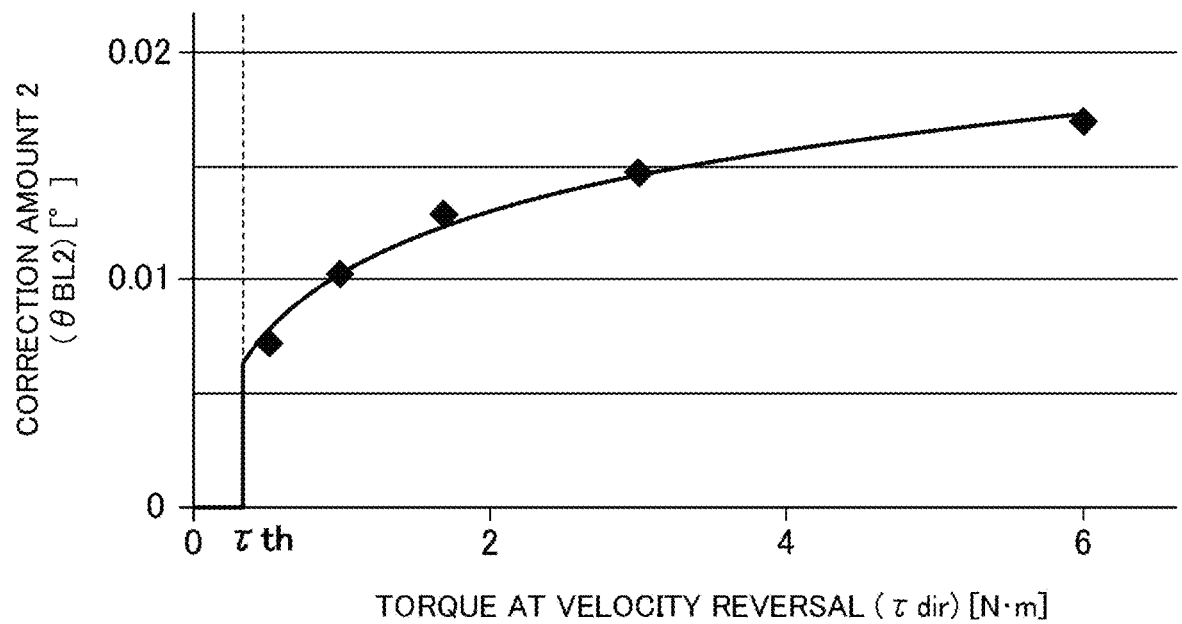
FIG. 21 is a graph illustrating the relation between the reverse torque and the torsion correction amount.

As shown in FIG. 21, the reverse torque τdir and the correction amount 2 (θBL2) which is the torsion correction amount are in a relation in which the correction amount 2 (θBL2) increases as the reverse torque τdir increases.

Figure 22:
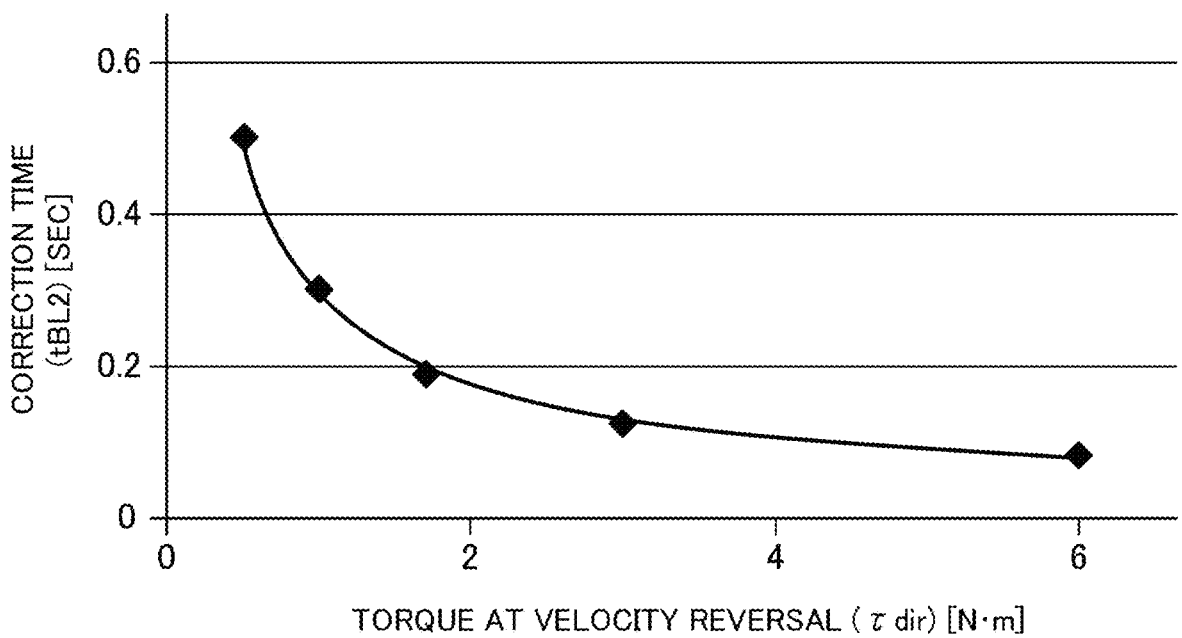
FIG. 22 is a graph illustrating the relation between the reverse torque and the correction period.

As shown in FIG. 22, the reverse torque τdir and the correction time tBL2 are in a relation in which the correction time tBL2 decreases as the reverse torque τdir increases.

Figure 23A:
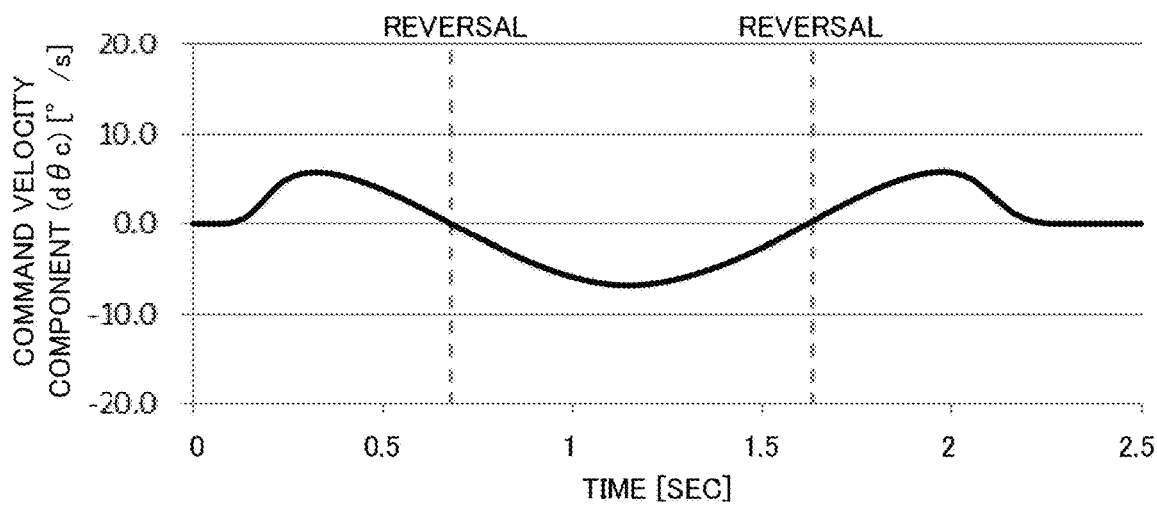
FIG. 23A is a graph showing variations in command velocity component.
Figure 23B:
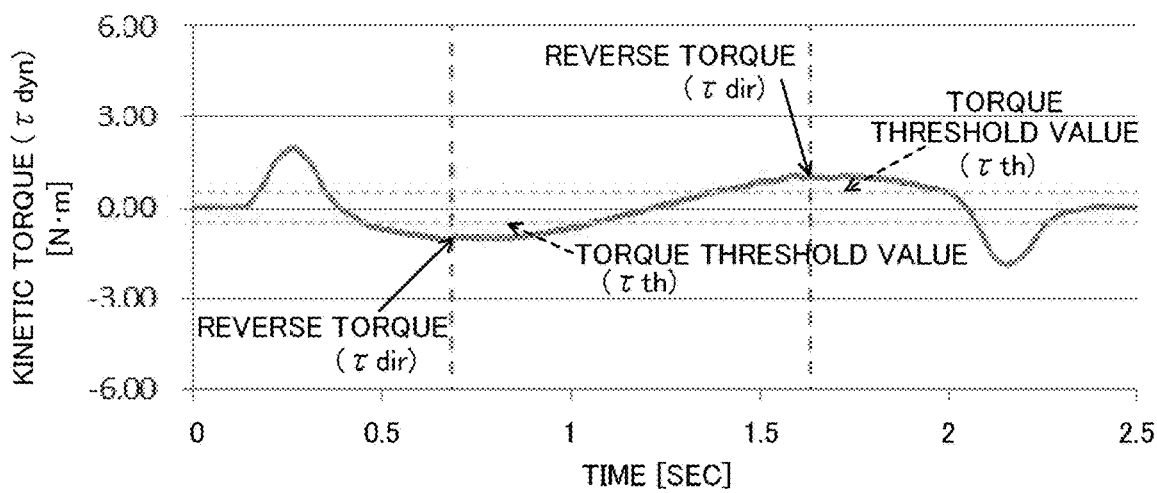
FIG. 23B is a graph showing variations in kinetic torque.
Figure 23C:
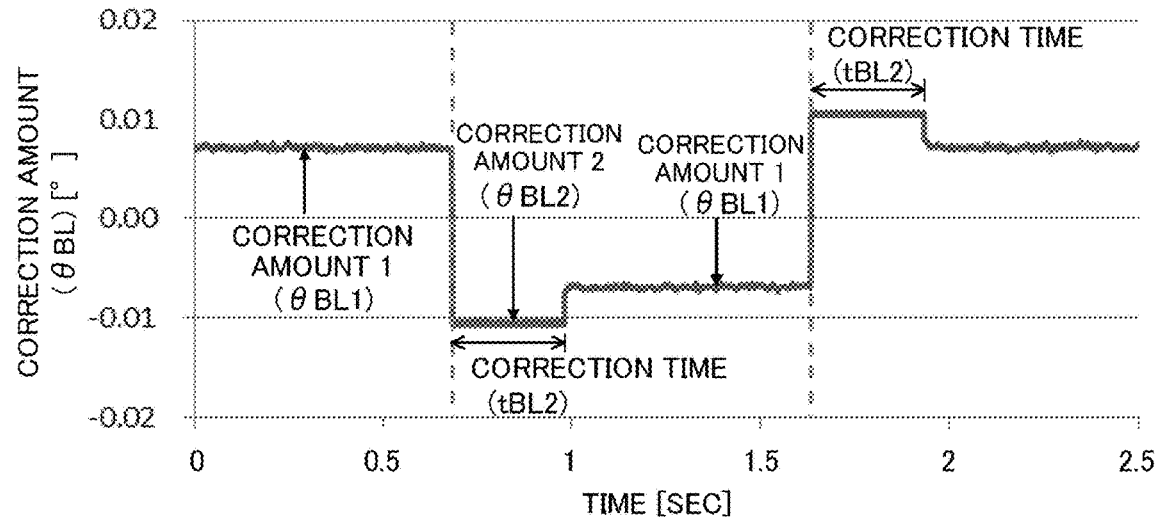
FIG. 23C is a graph showing variations in correction amount.

For example, in an operation of cutting out a circular workpiece having a diameter of 10 mm at 1 m/min as shown in FIGS. 23A to 23C, the reverse torque τdir is reduced because the rotational speed of the motor 12 in this operation is lower than the rotational speed of the motor 12 in the operation shown in FIGS. 20A to 20C (cutting out the circular workpiece having a diameter of 10 mm at 2 m/min). Thus, the correction amount 2 (θBL2) that is to be added or subtracted to or from the position command is reduced, and the correction time tBL2 is increased.

As can be seen from the foregoing description, according to the robot control device 20 of this embodiment, it is possible to reduce the path error of the robot arm 2 by correcting torsion in addition to correcting backlash at the joint portion J1, which is a correction target, if the reverse torque is greater than the predetermined threshold value.

Second Embodiment

Figure 24:
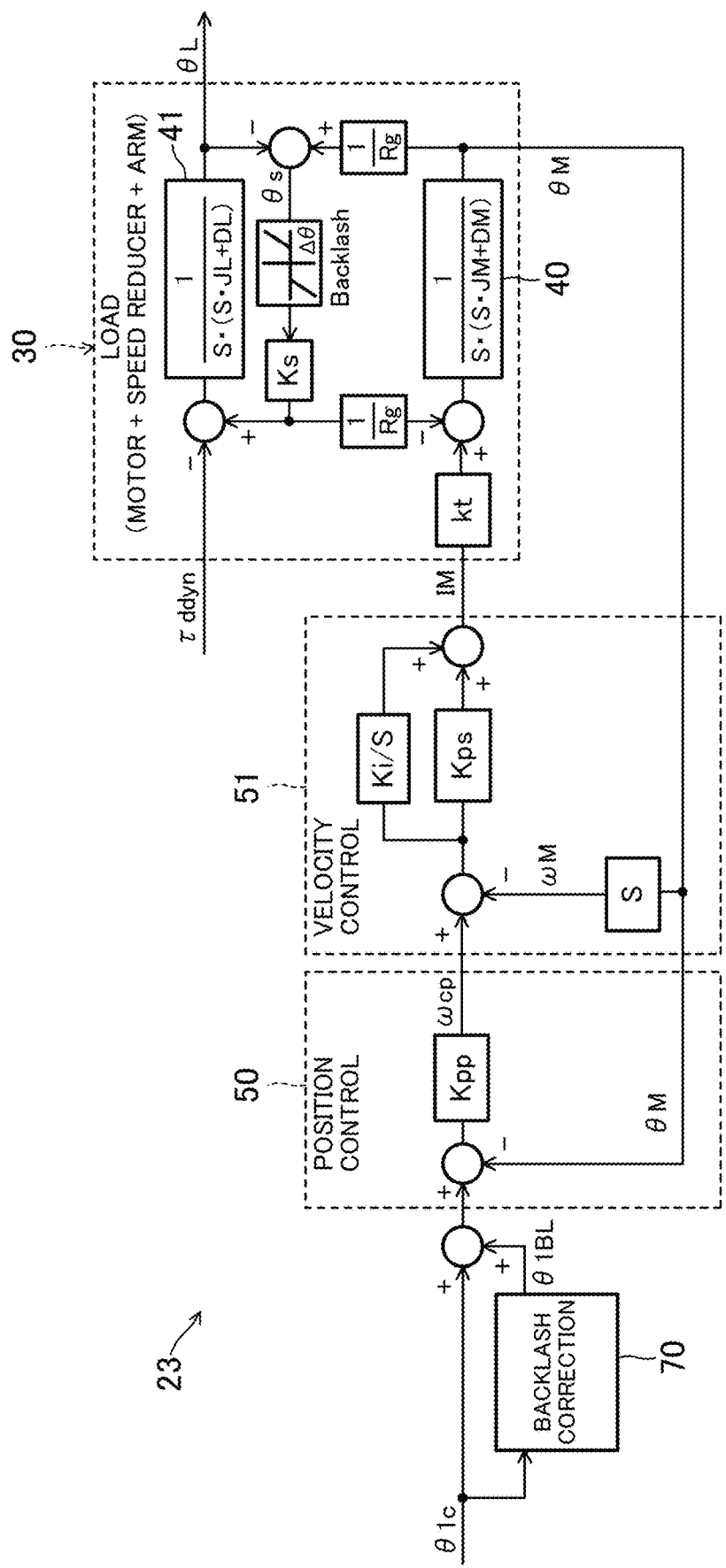
FIG. 24 is a block diagram of a robot control device according to a second embodiment.

FIG. 24 is a block diagram of a robot control device according to a second embodiment. In the following description, the same reference characters designate the same components as those of the first embodiment, and the description is focused only on the difference between this embodiment and the first embodiment.

As shown in FIG. 24, only a position command θ1c for a joint portion J1 (a pivot), which is targeted for correction, is input to a backlash correction block 70.

Gravity is not applied to the joint portion J1. Further, the working speed that achieves necessary path accuracy is lower than or equal to 10 m/min (1/20 or less of the highest speed). Thus, as indicated by the following formula (1), the main component of the kinetic torque τdyn is the inertial force of the axis of the joint portion J1.

$$\tau dyn \approx J \times \alpha C \quad (1)$$

where J represents the inertia around the pivot. The inertia depends on the posture of the robot 1 in operation. Further, αC represents an acceleration component. The acceleration component αC is a value obtained by differentiation of an angular velocity component dθc.

Figure 25:
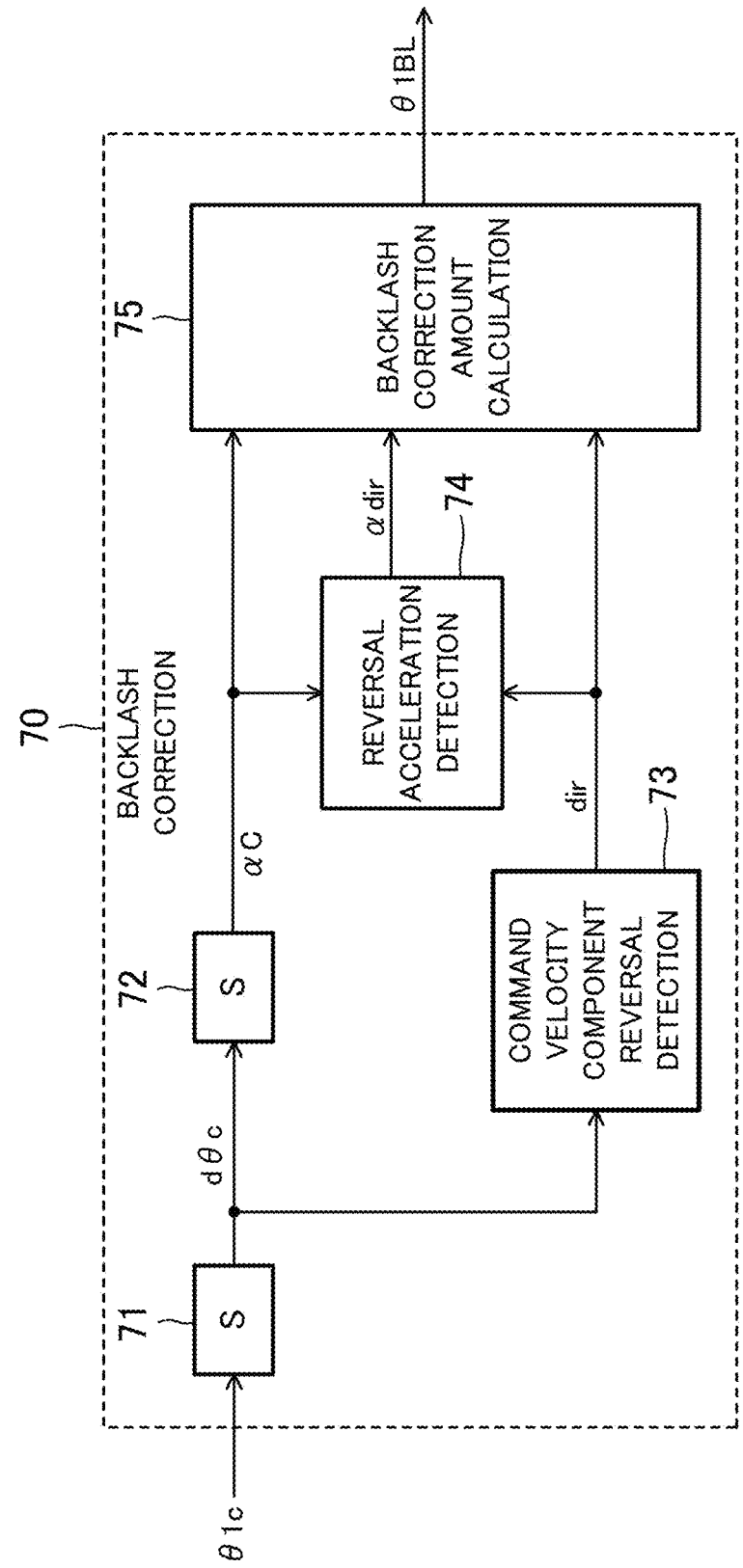
FIG. 25 is a block diagram of a backlash correction block.

FIG. 25 shows detailed configurations of a backlash correction block. The backlash correction block 70 includes an angular velocity calculation block 71, an acceleration calculation block 72, a command velocity component reversal detection block 73, a reversal acceleration detection block 74, and a backlash correction amount calculation block 75.

In the angular velocity calculation block 71, the angular velocity component dθc, which is a value obtained by differentiation of the position command θ1c for the pivot, is calculated. The angular velocity component dθc calculated in the angular velocity calculation block 71 is input to the acceleration calculation block 72 and the command velocity component reversal detection block 73.

In the acceleration calculation block 72, the acceleration component αC, which is a value obtained by differentiation of the angular velocity component dθc, is calculated. The acceleration component αC calculated in the acceleration calculation block 72 is input to the reversal acceleration detection block 74 and the backlash correction amount calculation block 75.

In the command velocity component reversal detection block 73, the reversal timing dir is calculated based on the angular velocity component dθc. The reversal timing dir is input to the reversal acceleration detection block 74 and the backlash correction amount calculation block 75.

In the reversal acceleration detection block 74, the acceleration αdir at reversal is calculated based on the acceleration component αc and the reversal timing dir.

In the backlash correction amount calculation block 75, the correction amount θ1BL of the joint portion J1 is calculated based on the acceleration component αc, the acceleration αdir at reversal, and the reversal timing dir.

In a case of performing only backlash correction, a waveform including the backlash correction amount (correction amount 1 (θBL1)) is output as the correction amount θ1BL. The backlash correction amount is a value determined in advance by an experiment or any other factor.

On the other hand, in a case of performing backlash correction and torsion correction, a waveform including the correction amount 1 (θBL1), the torsion correction amount (correction amount 2 (θBL2)), and the correction time tBL2 shown in FIG. 26C described below, for example, is output as the correction amount θ1BL.

The correction amount θ1BL calculated in the backlash correction amount calculation block 64 is incorporated in the position command dθc to be transmitted to the first servo control section 23 from the main control section 22. The thus obtained new position command is input to the first servo control section 23 so that the servo control section 23 control the driving of the first motor 12.

The first servo control section 23 adjusts the correction amount in accordance with the magnitude of the acceleration αdir at reversal. Specifically, in the case of the above-described operation of cutting out the circular workpiece having a diameter of 10 mm at 0.2 m/min (see FIG. 2), the influence of the torsion that occurs at the joint portion J1 is small because the acceleration αdir at reversal is smaller than the predetermined acceleration threshold value αth. Thus, only backlash correction is needed.

Figure 26A:
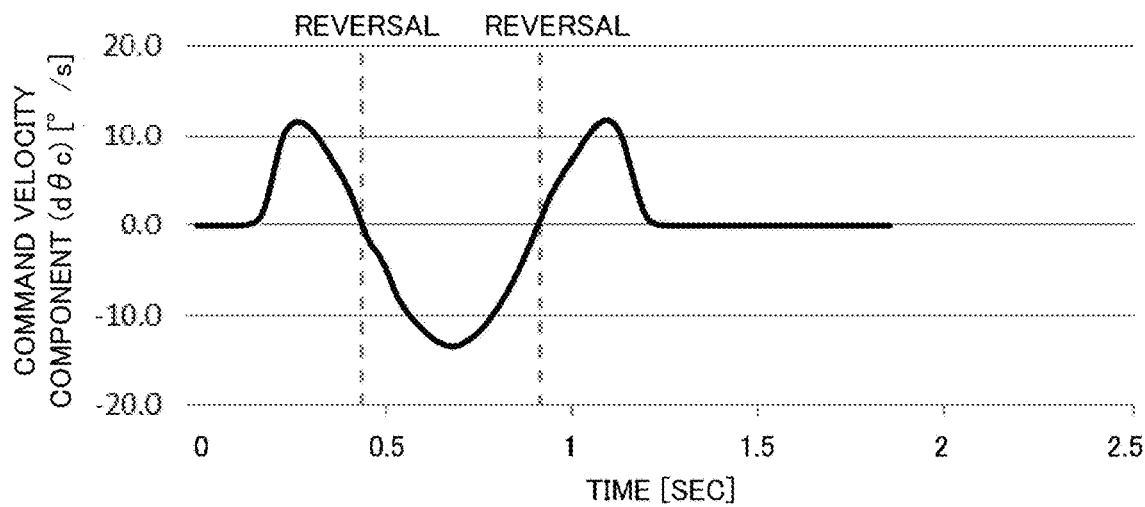
FIG. 26A is a graph showing variations in command velocity component.
Figure 26B:
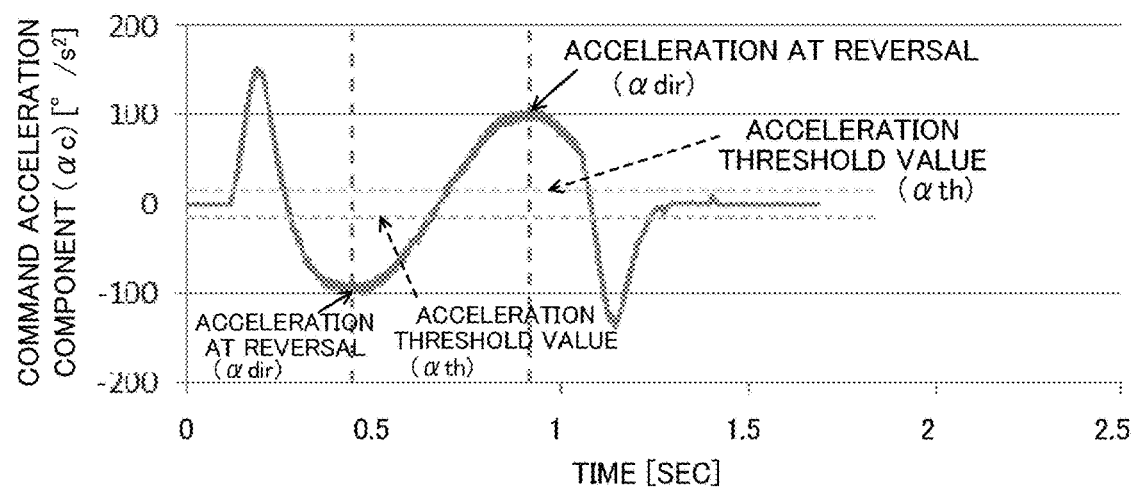
FIG. 26B is a graph showing variations in command acceleration component.
Figure 26C:
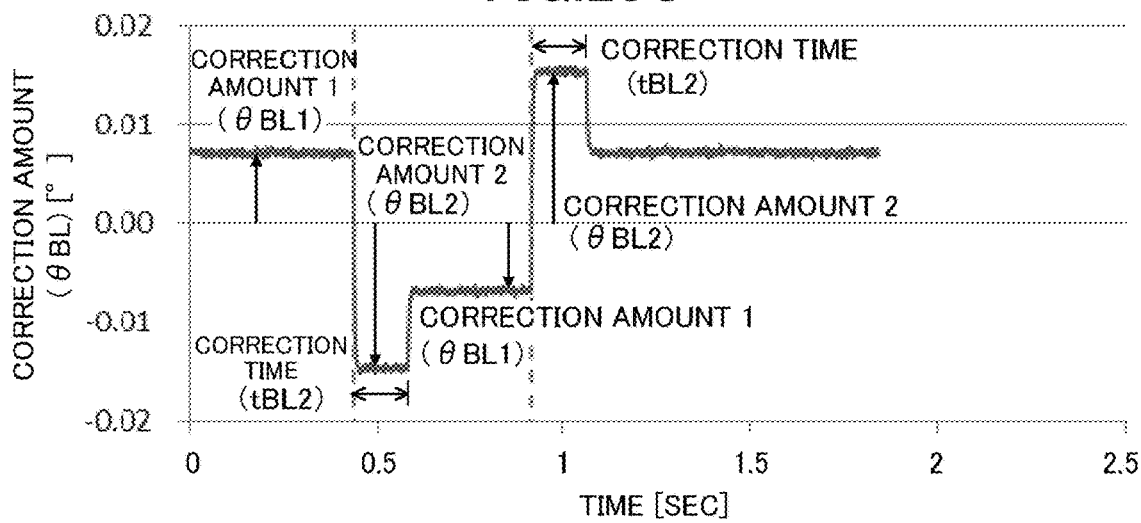
FIG. 26C is a graph showing variations in correction amount.

On the other hand, the graphs shown in FIGS. 26A to 26C respectively show changes in command velocity component, kinetic torque, and correction amount over time in the operation of cutting out the circular workpiece having a diameter of 10 mm at 2 m/min (see FIG. 7).

Under the condition where the circular workpiece having a diameter of 10 mm is cut out at 2 m/min, the laser cutting speed is high. Thus, the acceleration αdir at reversal exceeds the predetermined acceleration threshold value αth as shown in FIG. 26B.

Thus, the influence of the torsion that occurs at the joint portion J1 is significant, and not only backlash but also torsion may be corrected as shown in FIG. 26C.

Figure 27:
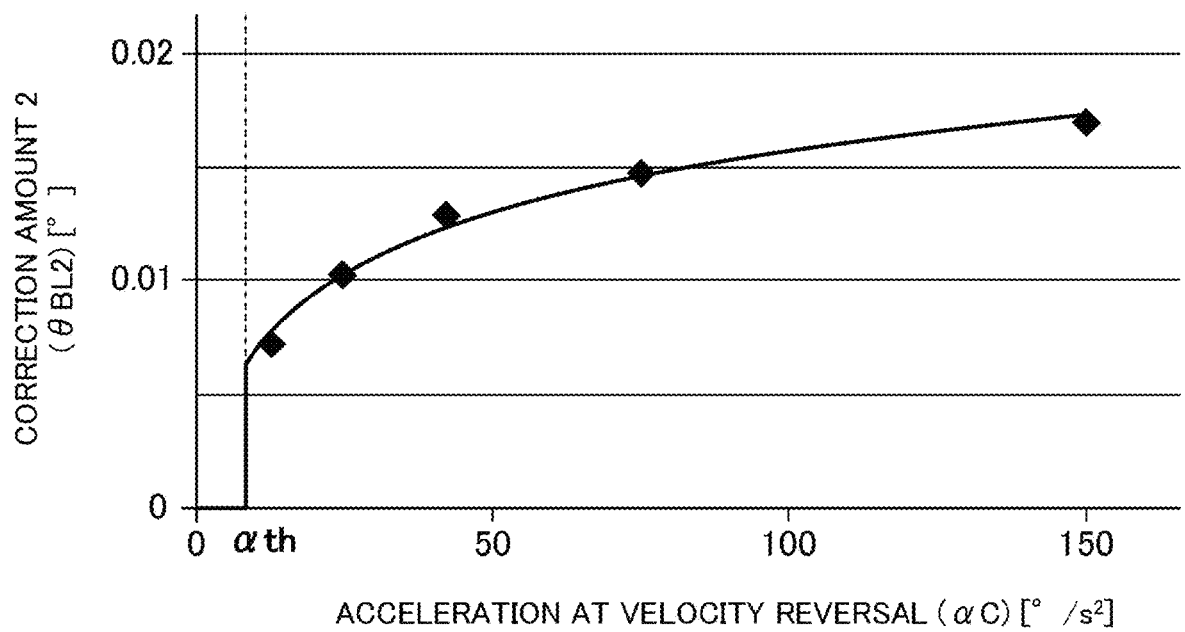
FIG. 27 is a graph illustrating the relation between the acceleration at velocity reversal and the torsion correction amount.

As shown in FIG. 27, the acceleration αdir at reversal and the correction amount 2 (θBL2) which is the torsion correction amount are in a relation in which the correction amount 2 (θBL2) increases as the acceleration αdir at reversal increases.

Figure 28:
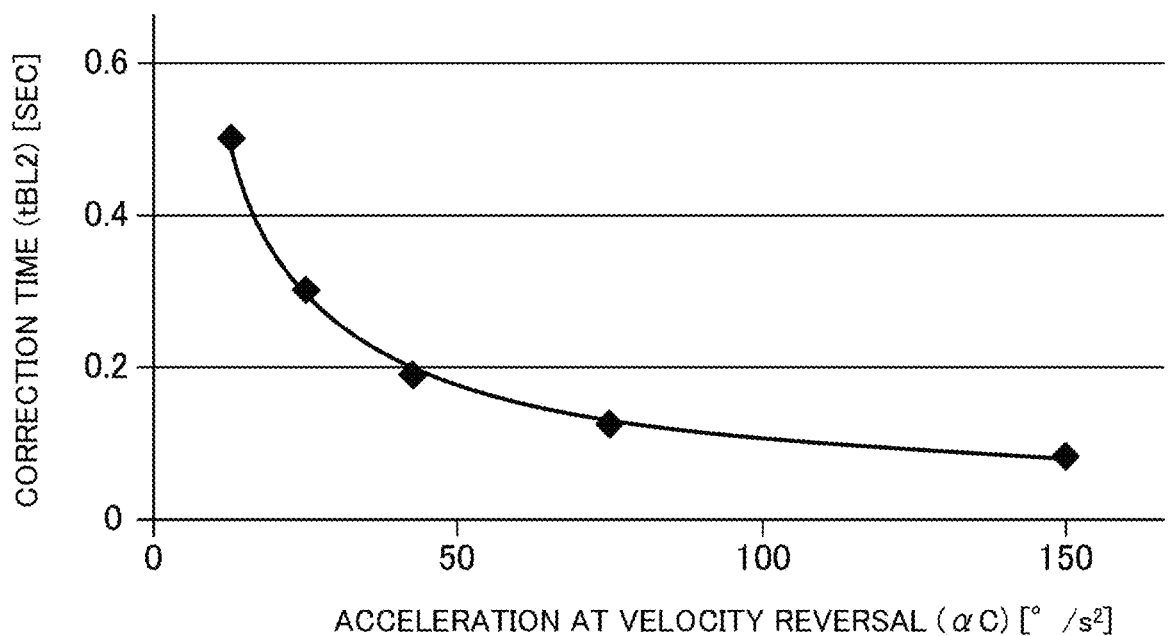
FIG. 28 is a graph illustrating the relation between the acceleration at velocity reversal and the correction time.

As shown in FIG. 28, the acceleration αdir at reversal and the correction time tBL2 are in a relation in which the correction time tBL2 decreases as the acceleration αdir at reversal increases.

For example, in an operation of cutting out a circular workpiece having a diameter of 10 mm at 1 m/min, the acceleration αdir at reversal is reduced because the rotational speed of the motor 12 in this operation is lower than the rotational speed of the motor 12 in the operation shown in FIGS. 26A to 26C (cutting out the circular workpiece having a diameter of 10 mm at 2 m/min). Thus, the correction amount 2 (θBL2) that is to be added or subtracted to or from the position command is reduced, and the correction time tBL2 is increased.

To accommodate changes in the inertia about the pivot depending on the posture of the robot 1, multiple sets of tables respectively indicating the correction amount 2 (θBL2) and the correction time tBL2 shown in FIGS. 27 and 28 may be prepared.

As can be seen from the foregoing description, according to the robot control device 20 of this embodiment, it is possible to reduce the path error of the robot arm 2 by correcting torsion in addition to correcting backlash at the joint portion J1, which is a correction target, if the acceleration at reversal is greater than the predetermined threshold value.

OTHER EMBODIMENTS

The embodiments described above may be modified as follows.

In the embodiments, the vertical articulated six-axis robot 1 has been described as a non-limiting example. The number of joint portions of the robot is not limited to six, and may be changed as appropriate depending on the specifications of the robot.

As can be seen from the foregoing description, the present invention can reduce the path error of a robot arm, which is very practical and useful and therefore highly applicable in the industry.

What is claimed is:

1. A robot control method for controlling a motion of a robot arm having a plurality of joint portions, the method comprising:
    calculating an angular velocity of at least one of the plurality of joint portions which is targeted for correction;
    calculating a torque applied to the at least one joint portion targeted for correction, based on position commands for the plurality of joint portions;
    calculating a reversal timing at which a direction of rotation of the at least one joint portion targeted for correction is reversed, based on the angular velocity of the at least one joint portion targeted for correction;
    calculating a reverse torque applied to the at least one joint portion targeted for correction, based on the torque and the reversal timing;
    calculating, based on the reverse torque and the reversal timing, a torsion correction amount and correction time for correcting torsion that occurs, due to the reverse torque, at the at least one joint portion targeted for correction; and
    if the reverse torque is smaller than a predetermined threshold value, correcting a corresponding one of the position commands for the at least one joint portion targeted for correction, based on a backlash correction amount for correcting backlash that occurs at the at least one joint portion targeted for correction, and if the reverse torque is larger than the predetermined threshold value, correcting the position command for the at least one joint portion targeted for correction, based on the backlash correction amount, the torsion correction amount, and the correction time.

2. The robot control method of claim 1, wherein
    in the calculating the torsion correction amount and the correction time, the torsion correction amount and the correction time are calculated such that as the reverse torque increases, the torsion correction amount increases and the correction time decreases.

3. A robot control method for controlling a motion of a robot arm having a plurality of joint portions,
    at least one of the plurality of joint portions which is targeted for correction having a pivot on which the robot arm is pivoted, the method comprising:
    calculating an angular velocity of the pivot based on a position command for the pivot;
    calculating an acceleration of the pivot based on the angular velocity of the pivot;
    calculating a reversal timing at which a direction of rotation of the pivot is reversed, based on the angular velocity of the pivot;
    calculating an acceleration at reversal of the pivot based on the acceleration of the pivot and the reversal timing;
    calculating a torsion correction amount and correction time for correcting torsion that occurs at the pivot at the reversal of the pivot, based on the acceleration at reversal and the reversal timing; and
    if the acceleration at reversal is smaller than a predetermined threshold value, correcting the position command for the pivot, based on a backlash correction amount for correcting backlash that occurs at the pivot, and if the acceleration at reversal is larger than the predetermined threshold value, correcting the position command for the pivot, based on the backlash correction amount, the torsion correction amount, and the correction time.

4. The robot control method of claim 3, wherein
    in the calculating the torsion correction amount and the correction time, the torsion correction amount and the correction time are calculated such that as the acceleration at reversal increases, the torsion correction amount increases and the correction time decreases.

5. A robot control device for controlling a motion of a robot arm having a plurality of joint portions, the robot control device comprising:
    an angular velocity calculator that calculates an angular velocity of at least one of joint portions which is targeted for correction;
    a kinetic calculator that calculates a torque applied to the at least one joint portion targeted for correction, based on position commands for the plurality of joint portions;
    a reversal timing calculator that calculates a reversal timing at which a direction of rotation of the at least one joint portion targeted for correction is reversed, based on the angular velocity of the at least one joint portion targeted for correction;
    a reverse torque calculator that calculates a reverse torque applied to the at least one joint portion targeted for correction, based on the torque and the reversal timing; and
    a correction amount calculator that calculates, based on the reverse torque and the reversal timing, a torsion correction amount and correction time for correcting torsion that occurs, due to the reverse torque, at the at least one joint portion targeted for correction,
    the correction amount calculator outputs, if the reverse torque is smaller than a predetermined threshold value, a correction amount for correcting a corresponding one of the position commands for the at least one joint portion targeted for correction, based on a backlash correction amount for correcting backlash that occurs at the at least one joint portion targeted for correction, and outputs, if the reverse torque is larger than the predetermined threshold value, the correction amount for correcting the position command for the at least one joint portion targeted for correction, based on the backlash correction amount, the torsion correction amount, and the correction time.

6. A robot control device for controlling a motion of a robot arm having a plurality of joint portions, at least one of the plurality of joint portions which is targeted for correction having a pivot on which the robot arm is pivoted, the robot control device comprising:

an angular velocity calculator that calculates an angular velocity of the pivot based on a position command for the pivot;

an acceleration calculator that calculates an acceleration of the pivot based on the angular velocity of the pivot;

a reversal timing calculator that calculates a reversal timing at which a direction of rotation of the pivot is reversed, based on the angular velocity of the pivot;

a reversal acceleration calculator that calculates an acceleration at reversal of the pivot based on the acceleration of the pivot and the reversal timing; and a correction amount calculator that calculates a torsion correction amount and correction time for correcting torsion that occurs at the pivot at the reversal of the pivot, based on the acceleration at reversal and the reversal timing, the correction amount calculator outputs, if the acceleration at reversal is smaller than a predetermined threshold value, a correction amount for correcting the position command for the pivot, based on a backlash correction amount for correcting backlash that occurs at the pivot, and outputs, if the acceleration at reversal is larger than the predetermined threshold value, the correction amount for correcting the position command for the pivot, based on the backlash correction amount, the torsion correction amount, and the correction time.

* * * * *